United States Patent
Nalvarte

(10) Patent No.: US 11,369,081 B2
(45) Date of Patent: Jun. 28, 2022

(54) PROTECTIVE ENCLOSURE FOR AN ANIMAL AND METHOD OF MAKING

(71) Applicant: The Heated Dog House, Centennial, CO (US)

(72) Inventor: Moises H. Nalvarte, Centennial, CO (US)

(73) Assignee: THE HEATED DOG HOUSE, Centennial, CO (US)

(*) Notice: Subject to any disclaimer, the term of this patent is extended or adjusted under 35 U.S.C. 154(b) by 0 days.

(21) Appl. No.: 17/520,542

(22) Filed: Nov. 5, 2021

(65) Prior Publication Data
US 2022/0142113 A1 May 12, 2022

Related U.S. Application Data

(60) Provisional application No. 63/110,414, filed on Nov. 6, 2020.

(51) Int. Cl.
*A01K 1/03* (2006.01)
*F24D 13/02* (2006.01)
*A01K 11/00* (2006.01)

(52) U.S. Cl.
CPC ............ *A01K 1/033* (2013.01); *A01K 11/006* (2013.01); *F24D 13/024* (2013.01)

(58) Field of Classification Search
CPC .. A01K 1/0076; A01K 1/0047; A01K 11/006; A01K 1/033; F24D 13/024
See application file for complete search history.

(56) References Cited

U.S. PATENT DOCUMENTS

| 3,991,717 A | 11/1976 | Buchanan |
| 4,332,214 A | 6/1982 | Cunningham |

(Continued)

FOREIGN PATENT DOCUMENTS

| CN | 108617518 A | * 10/2018 |
| CN | 108668909 A | * 10/2018 |

(Continued)

OTHER PUBLICATIONS

Author Unknown, "How to Heat a Dog House . . . (3 best ways)", Accessed mid 2021 from https://www.dailydogstuff.com/how-to-heat-a-dog-house/, 28 pages.

(Continued)

*Primary Examiner* — Monica L Barlow
*Assistant Examiner* — Aaron M Rodziwicz
(74) *Attorney, Agent, or Firm* — Stephen B. Katsaros; Patent Engineering, LLC

(57) ABSTRACT

In a configuration, a protective enclosure for an animal and method of making is disclosed. The protective enclosure may include a floor system and a plurality of wall systems that may define an internal portion of the protective enclosure. A first electrical heating element may be disposed within the floor system or one of the wall systems. At least one wall electrical heating element may be disposed within the at least one wall system of the plurality of wall systems. The first electrical heating element and the at least one wall electrical heating element may be powered by electricity and may be configured to direct heat inwardly from the floor system or the at least one wall system to increase temperature inside the internal portion of the protective enclosure.

27 Claims, 15 Drawing Sheets

(56) References Cited

U.S. PATENT DOCUMENTS

| | | | | |
|---|---|---|---|---|
| 5,937,792 | A * | 8/1999 | Madrid | A01K 1/00 119/482 |
| 5,975,025 | A * | 11/1999 | Kangas | A01K 1/033 119/484 |
| 6,357,512 | B1 * | 3/2002 | Baer | F24F 5/0046 165/48.2 |
| 6,403,922 | B1 * | 6/2002 | Hawks | A01K 1/0076 119/448 |
| 9,095,120 | B1 | 8/2015 | Skaggs | |
| 9,328,937 | B2 | 5/2016 | Tomlinson et al. | |
| 10,021,858 | B1 * | 7/2018 | Packard | A01K 1/0272 |
| 2003/0015146 | A1 * | 1/2003 | Hawks | A01K 1/034 119/448 |
| 2004/0031446 | A1 | 2/2004 | Harrison | |
| 2009/0205266 | A1 | 8/2009 | Fennell | |
| 2017/0112087 | A1 * | 4/2017 | Hargress | A01K 29/005 |
| 2018/0279563 | A1 * | 10/2018 | Wolfe | A01G 25/02 |
| 2019/0327929 | A1 * | 10/2019 | Yu | A01K 1/00 |
| 2020/0113153 | A1 * | 4/2020 | Yoo | A01K 1/0052 |
| 2020/0281152 | A1 * | 9/2020 | Higuchi | A01K 1/0076 |
| 2020/0337264 | A1 * | 10/2020 | Mahoney | A01K 1/0353 |

FOREIGN PATENT DOCUMENTS

| | | | |
|---|---|---|---|
| KR | 20200042303 A | * | 4/2020 |
| KR | 102161409 B1 | * | 9/2020 |

OTHER PUBLICATIONS

Franco, Michael, "All About Radiant Wall Heating", Updated Mar. 25, 2021 9:49 AM from https://www.bobvila.com/articles/radiant-surfaces-heat-where-you-least-expect-it/, 7 Pages.

Wheeler, Jessica, "Unique Radiant Ideas: Designing a Dog Kennel with Radiant Heating", Posted on Nov. 9, 2012 https://www.warmlyyours.com/en-US/posts/Unique-Radiant-Ideas-Designing-a-Dog-Kennel-with-Radiant-Heating-567, 4 pages.

* cited by examiner

DETAIL B

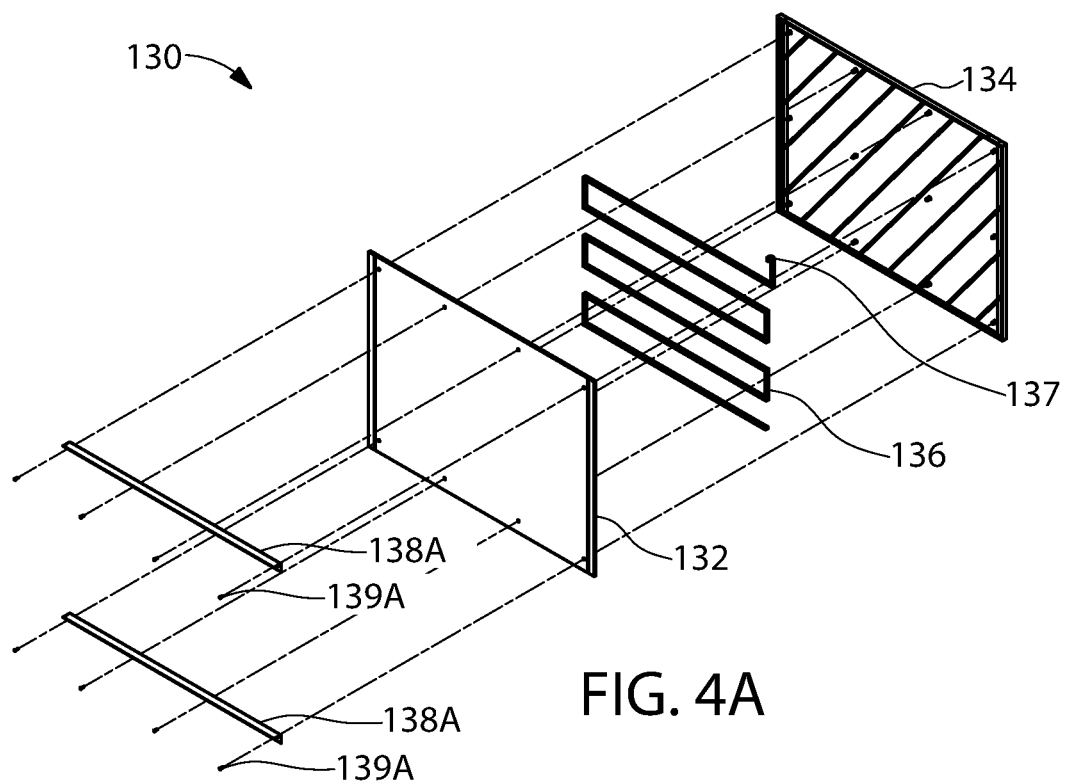
FIG. 4A
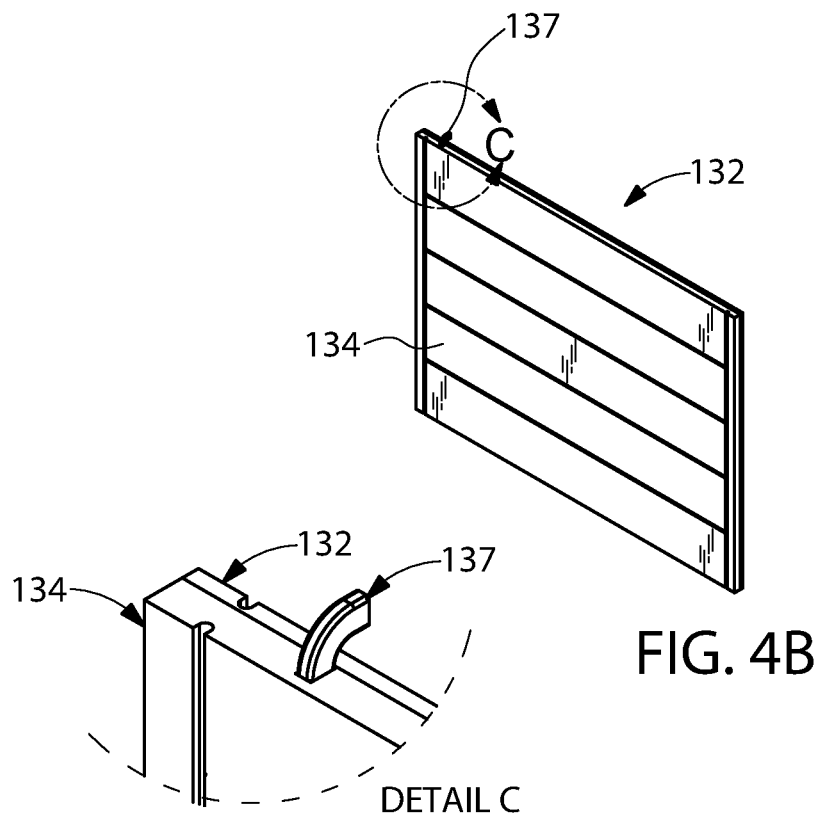
FIG. 4B
DETAIL C
FIG. 4C

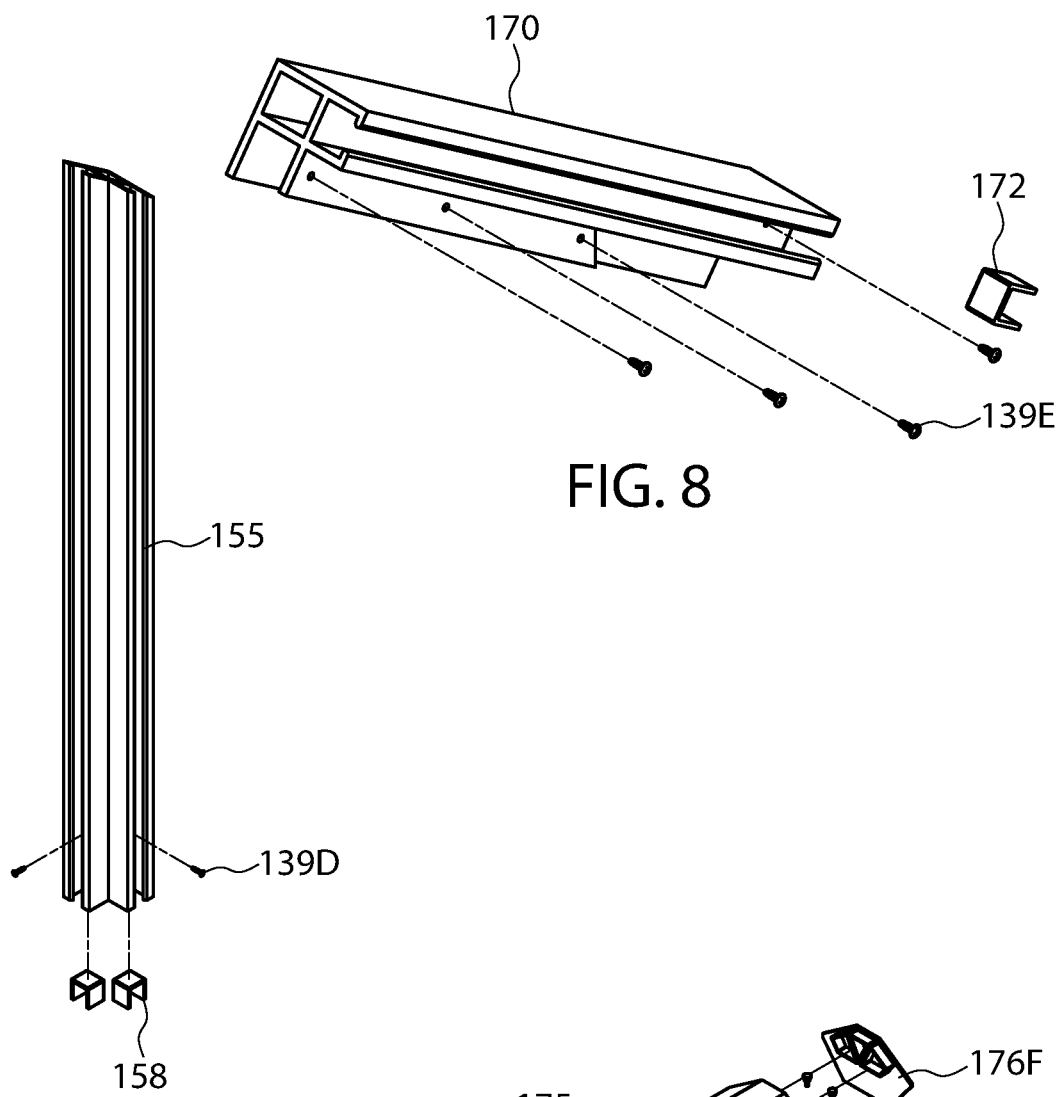
FIG. 8
FIG. 7
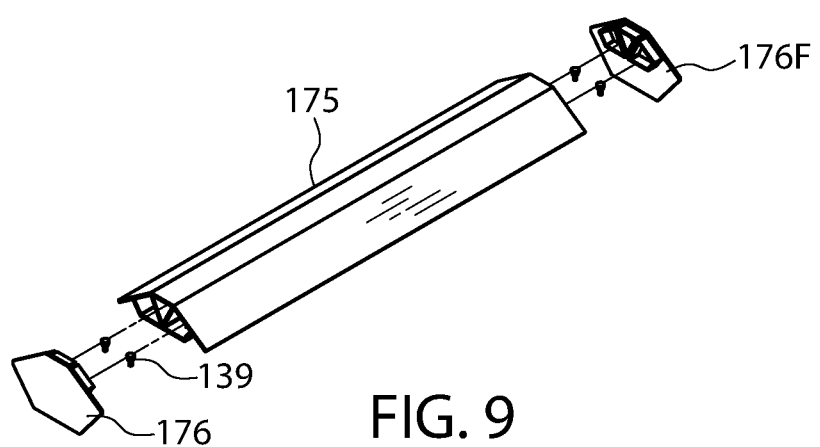
FIG. 9

PROTECTIVE ENCLOSURE FOR AN ANIMAL AND METHOD OF MAKING

CROSS REFERENCE TO RELATED APPLICATION

The present application claims priority to (i.e., is a non-provisional of) U.S. Provisional Patent Application No. 63/110,414 titled "PROTECTIVE ENCLOSURE FOR A CANINE AND METHOD OF MAKING" and filed on Nov. 6, 2020 by MOISES H. NALVARTE. The entirety of the aforementioned application is incorporated herein by reference for all purposes.

TECHNICAL FIELD

This disclosure relates in general to a protective enclosure and, but not by way of limitation, to a protective enclosure for an animal and a method of manufacturing the protective enclosure amongst other things.

BACKGROUND

Pet animals, for example, dogs may get left outside in cold temperatures, and many freeze to death. The main cause of death is hypothermia, frostbite, and/or congestive heart failure. According to People for the Ethical Treatment of Animals (PETA), in just one season between 2018 and 2019, at least fifty animals were reported dead due to extreme cold weather. As will be appreciated, leaving a pet outside in weather conditions that are too cold is not only brutal, but it is also illegal in many states. Traditional wooden dog houses are not able to effectively solve the problem of dangerously cold temperatures, snow, rain, winds, and blizzards. These conditions are exacerbated if the animal suffers from arthritis, bone cancer, or osteosarcoma (primary bone tumor).

Therefore, a need exists for a protective enclosure for animals that protects the canine or other animal from the dangerous weather conditions of rain, hail, or even sun, and is further capable of heating as needed to make the animal warm and comfortable, to thereby prevent unnecessary deaths from freezing.

SUMMARY

A protective enclosure for an animal and method of making is disclosed. The protective enclosure for an animal provides for a heated internal portion to help the animal cope with low ambient temperatures. The protective enclosure includes heated floor system and at least one heated wall system and optionally a heated ceiling system that are configured to generate heat and therefore maintain a suitable temperature inside the internal portion. The floor system, the wall system, and the ceiling system includes electrical heating elements, for example, electrical heating elements which are provided within these respective systems, such that the animal does not have a direct access to these electrical heating elements. By avoiding direct access to the electrical heating elements, any mishap of electrical shock and heat burn resulting from touching the heated elements can be avoided.

Further, the protective enclosure includes a sensor system which can detect whether the animal is present inside the protective enclosure or not and accordingly cause to start to stop the heating, thereby enhancing efficiency. Furthermore, the protective enclosure may include a thermostat to maintain the temperature according to a preset temperature condition. Moreover, an imaging device may be provided to capture images inside and outside the protective enclosure to record the activities of the animal, and these images may be transmitted to a user for real-time monitoring.

In some configurations, a protective enclosure for an animal is disclosed. The protective enclosure may include a floor system and a plurality of wall systems. In some configurations, the plurality of wall systems may include a left side wall system, a right side wall system, a rear wall system, and a front wall system. The left side wall system and the right side wall system may be positioned facing opposite to each other, and the rear wall system and the front wall system may be positioned facing opposite to each other. The floor system and the plurality of wall systems may define an internal portion of the protective enclosure. The protective enclosure may further include a floor electrical heating element which may be disposed within the floor system and at least one wall electrical heating element which may be disposed within the at least one wall system of the plurality of wall systems. The floor electrical heating element and the at least one wall electrical heating element may be powered by electricity and are connectable to a power source. The floor electrical heating element and the at least one wall electrical heating element may be configured to direct heat inwardly from the floor system and the at least one wall system to increase temperature of the internal portion of the protective enclosure.

In some configurations, the protective enclosure may further include a ceiling system and a roof system, such that the ceiling system and the roof system may define a space between each other.

In some configurations, the protective enclosure may further include an electrical box which may be configured to be positioned in the space defined by the ceiling system and the roof system. The electrical box may include a plug configured to connect to the power source. The floor electrical heating element and the at least one wall electrical heating element may be connectable to the power source via the plug. The power source may be a wall outlet or a portable generator.

In some configurations, the floor system may include an inner panel and an outer panel, and the floor electrical heating element may be sandwiched between the inner panel and the outer panel. Further, the at least one wall system may include an inner panel and an outer panel, such that the at least one wall electrical heating element is sandwiched between the inner panel and the outer panel. Each of the floor electrical heating element and the at least one wall electrical heating element may be selected from a resistive electrical heating element and an infrared (IR) electrical heating element.

In some configurations, the each of the floor electrical heating element and the at least one wall electrical heating element may include an array of electrical heating elements.

In some configurations, the protective enclosure may further include at least one sensor configured to detect a presence of the animal or an absence of the animal within the internal portion of the protective enclosure. The at least one sensor may be configured to generate a signal indicative of the presence or the absence of the animal within the internal portion of the protective enclosure and transmit the signal to at least one of the floor electrical heating element and the at least one wall electrical heating element. The signal indicative of the presence of the animal within the internal portion is configured to activate at least a portion of the array of the floor electrical heating element or at least a portion of the array of the at least one wall electrical heating element, and wherein the signal indicative of the absence of the animal within the internal portion is configured to deactivate at least a portion of the array of the floor electrical heating element and at least a portion of the array of the at least one wall electrical heating element.

In some configurations, the protective enclosure may further include a temperature sensor configured to detect temperature inside the internal portion of the protective enclosure. The temperature sensor may be further configured to regulate the temperature inside the internal portion of the protective enclosure. Regulating the temperature may include activating at least a portion of the array of the floor electrical heating element or activating at least a portion of the array of the at least one wall electrical heating element and deactivating at least a portion of the array of the floor electrical heating element or at least a portion of the array of the at least one wall electrical heating element, based on the predetermined temperature setting.

In some configurations, the protective enclosure may further include an imaging device configured to be positioned at the rear wall system. The rear wall system may include a molded receptacle, and the imaging device may be positioned at the rear wall system via the molded receptacle using a fastener. The imaging device may be directly, remotely, or wirelessly connected to the electrical box.

In some configurations, another protective enclosure for an animal is disclosed. The protective enclosure may include a plurality of electrical heating elements, and a floor system which includes at least a first electrical heating element of the plurality of electrical heating elements. The protective enclosure may further include at least one wall system which may include at least a second electrical heating element of the plurality of electrical heating elements, and a ceiling system. The plurality of electrical heating elements may be connectable to an electrical box which may be connectable to a power source. The floor system, the at least one wall system, and a ceiling system may define an internal portion. A temperature within the internal portion may be maintained at a predetermined temperature range based on a predetermined temperature setting. The predetermined temperature range may be one of above 32° F. (0° C.), above 35° F. (2° C.), above 40° F. (4° C.), above 45° F. (7° C.), above 50° F. (10° C.), above 55° F. (13° C.), above 60° F. (16° C.), and above 65° F. (18° C.).

In some configurations, this protective enclosure may further include at least one sensor configured to detect a presence of the animal or an absence of the animal within the internal portion of the protective enclosure. The at least one sensor may be configured to generate a signal indicative of the presence or the absence of the animal within the internal portion of the protective enclosure and transmit the signal to at least one of the first electrical heating element and the second electrical heating element. The signal indicative of the presence of the animal within the internal portion may cause to activate at least a portion of the first electrical heating element or at least a portion of the second electrical heating element. The signal indicative of the absence of the animal within the internal portion may cause to deactivate at least a portion of the first electrical heating element and at least a portion of the second electrical heating element.

In some configurations, a yet another protective enclosure for an animal is disclosed. This protective enclosure may include a floor system which may include at least a first electrical heating element of a plurality of electrical heating elements, and at least one wall system including at least a second electrical heating element of the plurality of electrical heating elements. Th protective enclosure may further include at least one sensor configured to detect a presence of the animal or an absence of the animal within an internal portion of the protective enclosure. The at least one sensor may be configured to generate a signal indicative of the presence or the absence of the animal within the internal portion of the protective enclosure and transmit the signal to at least one of the first electrical heating element and the second electrical heating element. The signal indicative of the presence of the animal within the internal portion is configured to activate at least a portion of the first electrical heating element or at least a portion of the second electrical heating element, and the signal indicative of the absence of the animal within the internal portion is configured to deactivate at least a portion of the first electrical heating element and at least a portion of the second electrical heating element.

In some configurations, a method of manufacture for a protective enclosure for an animal is disclosed. The method may include forming a first inner panel, forming a first outer panel, and sandwiching a first electrical heating element between the first inner panel and the first outer panel to form a first system. The first system may be selected from one of a floor systems and a side wall system. The method may further include forming a second inner panel, forming a second outer panel, and sandwiching a second electrical heating element between the second inner panel and the second outer panel to form a second system. The second system may be selected from the other of the floor system and the side wall system. The method may further include connecting the first electrical heating element and the second electrical heating element to an electrical box. The first electrical heating element and the second electrical heating element may be configured to direct heat inwardly from the floor system and the side wall system through the first and second inner panels to an internal portion of the protective enclosure.

In some configurations, the method may further include forming a ceiling system, and forming a roof system. The ceiling system and the roof system may define a space to house the electrical box. The method may further include positioning the electrical box in the space defined by the ceiling system and the roof system. The method may further include forming a rear wall system and forming a front wall system. The floor system, the side wall system, the ceiling system, the rear wall system and the front wall system may together define the internal portion of the protective enclosure. The method may further include positioning an imaging device at the rear wall system. The rear wall system may include a molded receptacle, such that the imaging device is positioned at the rear wall system via the molded receptacle using a fastener.

In some configurations, the protective enclosure further includes the temperature is automatically regulated to switch on upon detecting the animal's presence and to switch off upon detecting the animal's absence.

In some configurations, the protective enclosure further includes the internal portion of the enclosure is defined by the floor system, first and second wall systems, rear and front wall systems, and a ceiling system. A width of the internal portion may range between 25 inches to 45 inches, a length of the internal portion ranges between 28 inches to 42 inches, and wherein a height of the internal portion may range between 20 inches to 30 inches.

Further areas of applicability of the present disclosure will become apparent from the detailed description provided hereinafter. It should be understood that the detailed description and specific examples, while indicating various configuration, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include:

FIG. 4A illustrates an exploded view of a side wall system for the protective enclosure, in accordance with an illustrative configuration of the present disclosure;

FIG. 4B illustrates a perspective view of the assembled side wall system for the protective enclosure, in accordance with an illustrative configuration of the present disclosure;

FIG. 4C illustrates a magnified view of a detail C of FIG. 4B, in accordance with an illustrative configuration of the present disclosure;

FIG. 7 illustrates a perspective view of the corner post system for the protective enclosure, in accordance with an illustrative configuration of the present disclosure;

FIG. 8 illustrates a perspective view of the roof post system for the protective enclosure, in accordance with an illustrative configuration of the present disclosure;

FIG. 9 illustrates a perspective view of a roof cover system for the protective enclosure, in accordance with an illustrative configuration of the present disclosure;

Figure 1:
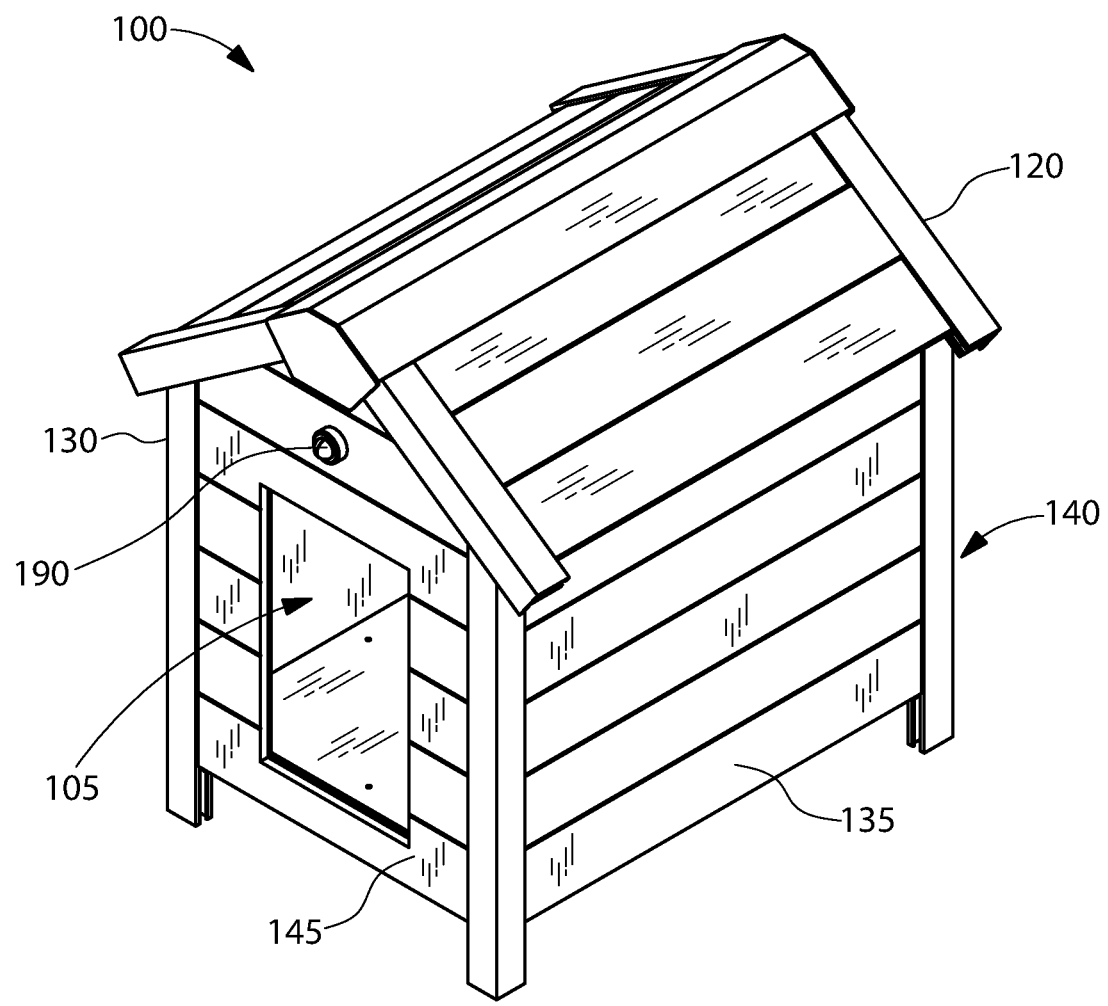
FIG. 1 illustrates a perspective view of a protective enclosure, in accordance with an illustrative configuration of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as exemplary only, with the true scope and spirit being indicated by the following claims.

Some protective enclosures for animals also called dog houses are known in the art that may use an insulation or a dryer hose. However, these dog houses are not as effective in providing warmth for various reasons. For example, some of these dog houses may utilize heater boxes or heating pads which require the heating unit to be installed inside the dog house. However, this may cause accidental burns to the animal if the animal happens to touch the heater boxes or heating pads. The heating pads are provided atop the floor of the dog house and, as such, do not provide evenly distributed heat inside the structure. Further, it may not be possible to secure the placement of the heating pads and therefore the heating pads may get displaced and may not work effectively. Also, the heating pads may be damaged by the animal chewing on them and scratching them.

It is, therefore, desirable to provide a protective enclosure for animals that protects the animals from the dangerous weather conditions of rain, hail, or even sun, and is further capable of heating as needed to make the animal warm and comfortable. Further, it is desirable that the protective enclosure is safe to use for the animals and minimizes any risks of mishaps due to touching any electrical elements. Further, it is desirable that the protective enclosure is capable of managing the temperature inside so as to avoid any underheating or overheating. Moreover, it is desirable to provide for uniform distribution of heat within the protective enclosure, to avoid high temperature spots which may cause burn injuries to the animal.

The protective enclosures disclosed herein provide protection and warmth safely to the animal. The protective enclosures disclosed herein may provide for automatically regulating the temperature within the internal portion of the protective enclosures. Further, the protective enclosures may provide energy efficiency through use of different materials for inner and outer panels and through the use of sensors to detect the presence of the animal and to activate heating only upon the detection of the presence of the animal.

Referring now to FIG. 1, a perspective view of a protective enclosure 100 is illustrated, in accordance with an illustrative configuration of the present disclosure. In one configuration, as shown in FIG. 1, the protective enclosure 100 may include a floor system and a plurality of wall systems. Further, the protective enclosure 100 may include a ceiling system and a roof system. The floor system along the plurality of wall systems, the ceiling system, and/or the roof system may define an internal portion 105 of the protective enclosure. The internal portion 105 may house an animal for example, a dog. The floor system may be raised from the ground level by corner posts supporting the weight of the protective enclosure 100.

Figure 2:
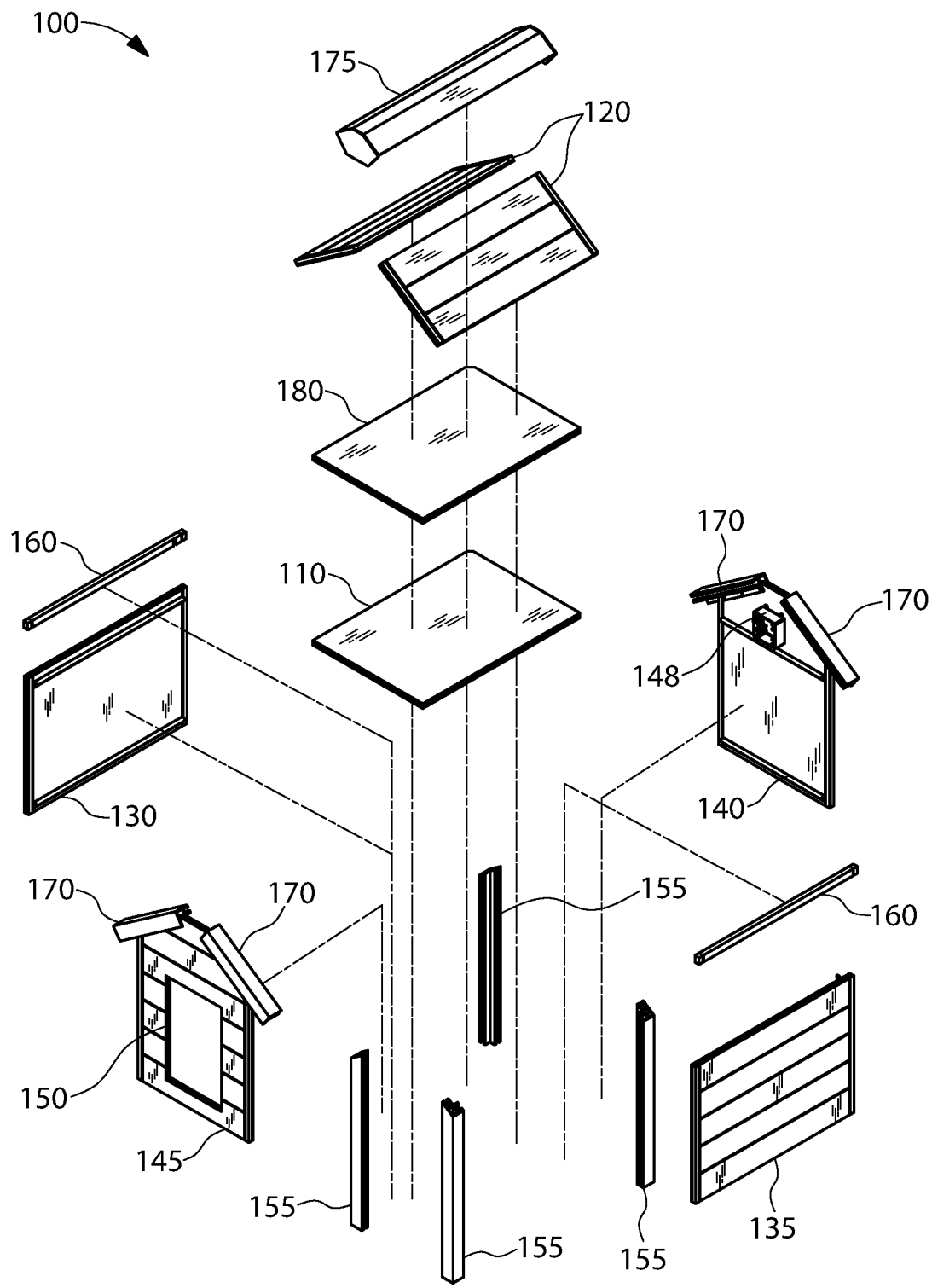
FIG. 2 illustrates an exploded view of the protective enclosure, in accordance with an illustrative configuration of the present disclosure.

Referring now to FIG. 2, an exploded view of the protective enclosure 100 is illustrated, in accordance with an illustrative configuration of the present disclosure. As shown in FIG. 2, the protective enclosure 100 may include a floor system 110, a ceiling system 180, and a roof system 120. Further, the protective enclosure 100 may include a plurality of wall systems. In one configuration, the plurality of wall systems may include a first side wall system 130 (also referred to as left wall system 130), and a second side wall system 135 (also referred to as right wall system 135). The first side wall system 130 and the second side wall system 135 may be provided at a left side and a right side, respectively of the protective enclosure 100. In one configuration, the plurality of wall systems may further include a rear wall system 140 and a front wall system 145. In one configuration, the front wall system 145 may include an opening 150 for entry to and exit from the protective enclosure 100. The protective enclosure 100 may further include corner posts 155. As further shown in the FIG. 2, the protective enclosure 100 may include four corner posts 155, each positioned at a corner of the protective enclosure 100. In some configurations, the protective enclosure 100 may further include at least one vent 160, at least one roof post 170, and a roof cover system 175. The protective enclosure 100 may further include an electrical box 148. In one configuration, as shown in the FIG. 2, the electrical box 148 may be configured to be positioned in an attic portion defined by ceiling system 180 and the roof system 120 or in the internal portion 105 for a configuration without a ceiling system.

In some configurations, at least one of the floor system 110, the plurality of wall systems (i.e. the left side wall 130, the right side wall system 135, the rear wall system 140, the front wall system 145), the ceiling system 180, and the roof system 120 may include an electrical heating element to generate heat and control the temperature inside the internal portion of the protective enclosure.

Figure 3A:
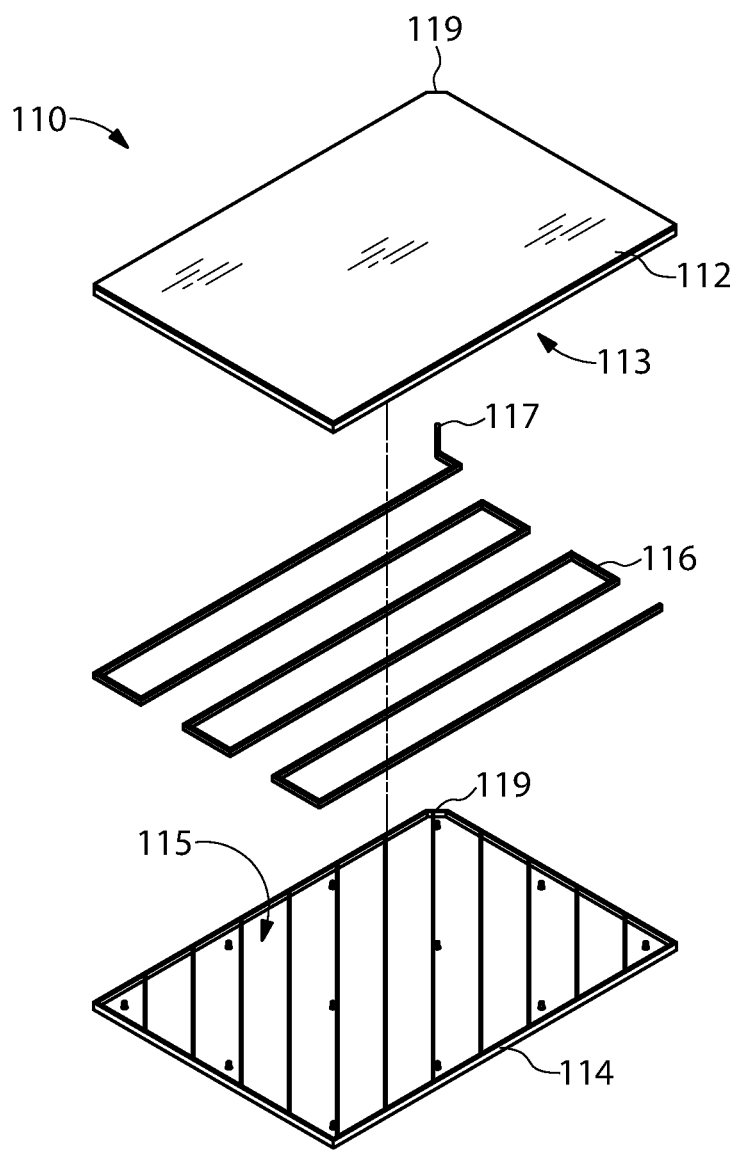
FIG. 3A illustrates an exploded view of a floor system of the protective enclosure, in accordance with an illustrative configuration of the present disclosure.

Referring now to FIG. 3A, an exploded view of the floor system 110 of the protective enclosure 100 is illustrated, in accordance with an illustrative configuration of the present disclosure. The protective enclosure 100 may include an electrical heating element positioned in a floor or a wall but referred to herein as a floor electrical heating element 116 which may be disposed within the floor system 110. In particular, the floor system 110 may include an inner panel 112 and an outer panel 114. Further, the floor electrical heating element 116 may be configured to be disposed between the inner panel 112 and the outer panel 114. To this end, each of the inner panel 112 and the outer panel 114 may include at least one channel 118. The floor electrical heating element 116 may run through at least one channel 118 (as shown in FIG. 3A). During operation, the floor electrical heating element 116 may generate heat. This heat may emit to the internal portion 105 of the protective enclosure 100 (as shown in FIG. 1) thereby allowing the pet to preserve and regulate its body temperature. It should be noted that the inner panel 112 and the outer panel 114 may sandwich or otherwise enclose the floor or walls electrical heating element 116 to isolate the floor electrical heating element 116 so that the animal is never in direct contact with the floor electrical heating element 116.

In some configurations, the inner panel 112 and the outer panel 114 may be mold manufactured. For example, the inner panel 112 and the outer panel 114 may be extruded to shape and cut to appropriate dimensions. The material for molding the inner panel 112 and the outer panel 114 may be selected so as to ensure that the protective enclosure 100 is stable at the temperature range to which the floor electrical heating element 116 is operable, and also stable in inclement weather conditions (i.e. rain, snow, wind, hail, etc.), as well as stable at extreme cold and hot temperatures exposures due to climate (from −20° F./−29° C. to 130° F./54° C.). As such, the material for molding the inner panel 112 and the outer panel 114 may be selected from a heat resistive plastic or thermoplastic, a biodegradable and compostable polymer, or a composite including a heat resistive plastic or thermoplastic. Further, an additional material such as filler made using recycled and/or reclaimed materials such as wood may be used. Other fillers may include color blending compounds to provide moldable forms with different color options.

In some configurations, the material for molding the inner panel 112 and the outer panel 114 is one selected from high-density polyethylene (HDPE), acrylonitrile styrene acrylate (ASA), polyvinyl chloride (PVC), polyethylene terephthalate (PET), Polydicyclopentadiene (PDCPD), polycarbonate, or other moldable polymer. In some configurations, the moldable material may be a biodegradable and compostable polymer such as Ecoflex® (BASF). Any suitable polymer or material that is weather resistant, and also conductive, to allow for the heat element to radiate heat but without melting or otherwise distorting the panels may be used.

The floor electrical heating element 116 (alternatively also referred to as floor electrical heating element 116) of the present disclosure provides heating to the protective enclosure 100. In some configurations, the floor electrical heating element 116 may be positioned between the inner panel 112 and the outer panel 114. The floor electrical heating element 116 may have a serpentine or other configuration designed to provide uniform distribution of heat run emanating from the inner panel 112 to the internal portion 105 of protective enclosure 100. In some configurations, inner panel 112 and outer panel 114 may be made of the same material. In other configurations, the inner panel 112 and the outer panel 114 may be made of different materials. For example, the outer panel 114 may be more insulative (and/or thicker) to protect from the outside environment, while the inner panel 112 may be more conductive (and/or thinner) to conduct heat from the electrical heating elements to the internal portion 105.

Further, the inner panel 112 and the outer panel 114 may have the same or different U-value. As will be understood, the U-value is an indicator of thermal transmittance, i.e. the rate of transfer of heat through matter. The thermal transmittance of a material (such as that of the inner panel 112 or the outer panel 114) or an assembly (such as the floor system 110 or the side wall system 130, 135, as will be discussed later in this disclosure) may be expressed as a U-value. The U-values may range between about 0.09 W/mK to about 0.12 W/mK and may vary depending upon the thickness of the inner panel 112 and the outer panel 114, respectively, and upon the location of the at least one channel 118 provided in the inner panel 112 or the outer panel 114 of the floor system 110 as shown in FIG. 3A to FIG. 3G. As will be further understood, heat consumption, or the energy required to heat the internal portion 105 may be directly proportional to the U-value. In some configurations, the inner panel 112 has a thermal transmittance greater than that of the outer panel 114, the outer panel having a lower U-value. In some configurations, a fire-resistant, waterproof thermal insulation layer may be disposed between the inner panel 112 and the outer panel 114 of the floor system 110.

It may be noted that other systems described later herein this disclosure (i.e. the side wall systems 130, 135, the rear wall system 140, the front wall system 145, the ceiling system 180, and the roof system 120) may also include an inner panel and an outer panel similar to the inner panel 112 and the outer panel 114 of the floor system 110.

In one configuration, the floor system 110 may further include a cut-out 119. Alternately, the floor system 110 may include a through hole, or a channel, or a pathway. The cut-out 119 may allow a trace extender 117 of the floor electrical heating element 116 extending from the floor system 110 to be electrically connected to an electrical box 148. It should be noted that the trace extender 117 may be configured to connect the floor electrical heating element 116 with the electrical box 148. For example, the trace extender 117 may extend upward adjacent to one of the corner posts 155. This is further explained in conjunction with FIG. 3B.

Figure 3B:
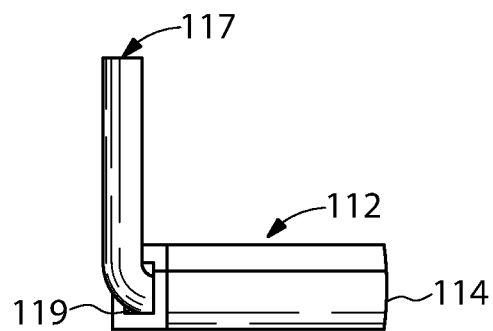
FIG. 3B illustrates an assembled view of the floor system in accordance with an illustrative configuration of the present disclosure.

Referring now to FIG. 3B, an assembled view of the floor system 110 is illustrated in accordance with an illustrative configuration of the present disclosure. As shown in FIG. 3B, the trace extender 117 of the floor electrical heating element 116 is ejected out through the cut-out 119.

Figure 3C:
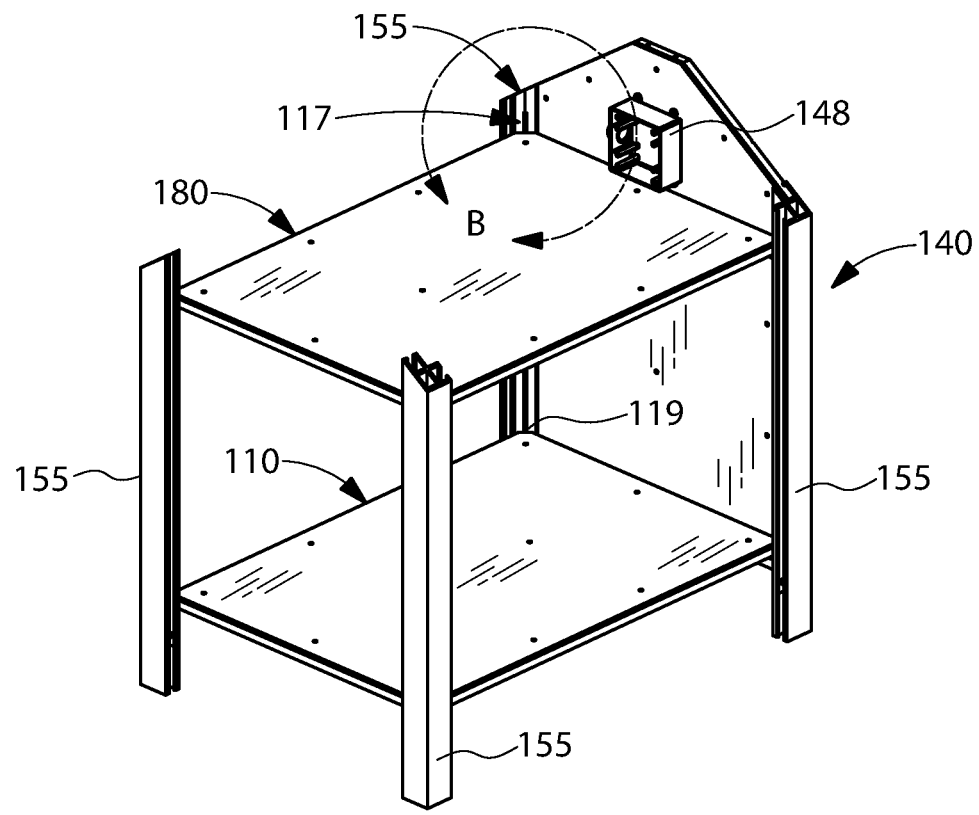
FIG. 3C illustrates a perspective view of the partially assembled protective enclosure, in accordance with some illustrative configurations of the present disclosure.
Figure 3D:
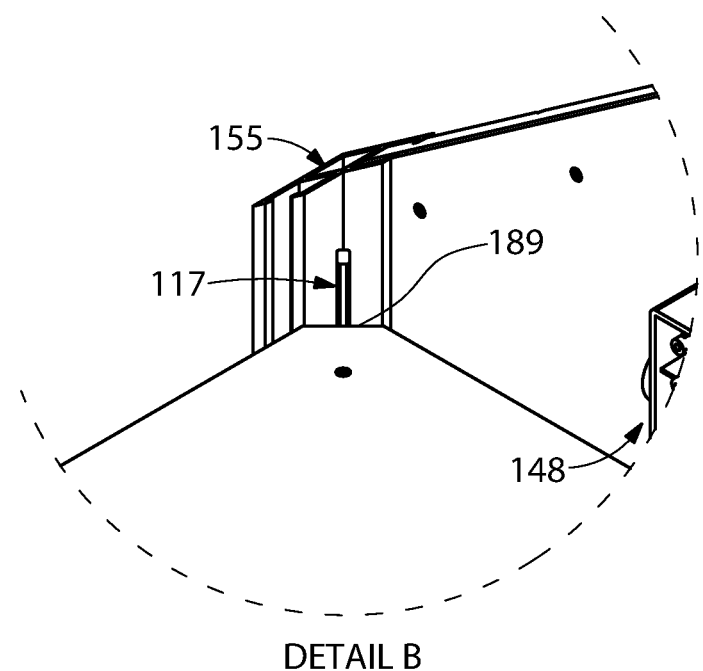
FIG. 3D illustrates a magnified view of a detail B from the FIG. 3C, in accordance with some illustrative configurations of the present disclosure.

Referring now to FIG. 3C, a perspective view, partially assembled, of the protective enclosure 100 is illustrated, in accordance with some configurations of the present disclosure as illustrated in FIG. 11, the trace extender 117 of floor electrical heating element 116 feeds from the floor system 110 up into an attic portion above the celling system 180, so as to connect with the electrical box 148. As mentioned above, the attic portion is where the electrical box 148 is secured to the rear wall system 140. The electrical box 148 may be positioned in the attic portion inside protective enclosure 100 or on the upper portion of the rear wall to prevent contact with the animal. Further, it is from electrical box 148 that the current is distributed to the floor system 110, or the side wall system 130, 135, or the rear wall system 140, or front wall system 145, or the ceiling system 180. FIG. 3D illustrates a magnified view of detail B from the FIG. 3C. As it can be seen in FIG. 3D, one of the corner posts 155 may guide the trace extender 117 through the cut-out 189 of the ceiling system 180 (similar to the cut-out 119 of floor system 110).

Figure 3E:
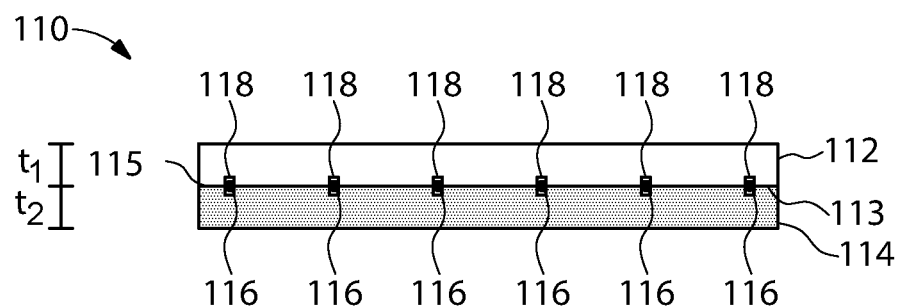
FIG. 3E illustrates a cross-sectional view of the floor system, in accordance with one illustrative configuration of the present disclosure

Referring now to FIG. 3E, a cross-sectional view of the floor system 110 is illustrated, in accordance with one configuration of the present disclosure. As shown in FIG. 3E, each of the inner panel 112 and the outer panel 114 may include at least one channel 118. The floor electrical heating element 116 may be sandwiched between the inner panel 112 and the outer panel 114 via the at least one channel 118. In particular, an inner face 113 of the inner panel 112 and/or an inner face 115 of the outer panel 114 may include at least one channel 118 for accommodating the floor electrical heating element 116. In other words, only the inner face 113 of the inner panel 112 may include the channel 118, or only the inner face 115 of the outer panel 114 may include the channel 118, or both the inner face 113 of the inner panel 112 and the inner face 115 of the outer panel 114 may include the channel 118 for accommodating the floor electrical heating element 116.

It should be noted that a thickness $t_1$ of the inner panel 112 may be the same or different than a thickness t2 of the outer panel 114. As the inner panel 112 and the outer panel 114 are mold manufactured, the shape of the inner face 113 and of the inner face 115 may be in any suitable configuration to enclose the electrical heating element 116. In some configurations, the floor electrical heating element 116 may include heat traces or heat cells. The floor electrical heating element 116 may be applied to the inner faces 113, 115 of either or both of the inner panel 112 and the outer panel 114 via printing or silk screen techniques. Alternately, the floor electrical heating element 116 may be in the form of a ribbon cable, an electrical circuit, or a flexible circuit. In some configurations, the floor electrical heating element 116 may further include a sensor component, such as to detect pressure, light, or heat, for example.

Figure 3F:
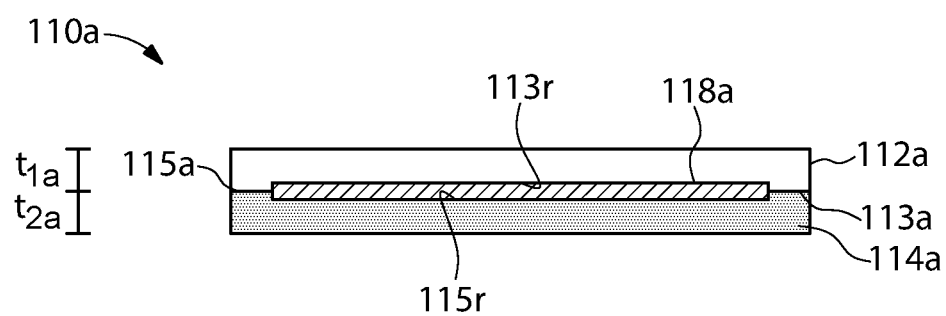
FIG. 3F illustrates another cross-sectional view of a floor system, in accordance with another illustrative configuration of the present disclosure

Referring now to FIG. 3F, a cross-sectional view of a floor system 110*a* is illustrated, in accordance with another configuration of the present disclosure. The floor system 110*a* may include an inner panel 112*a* having an inner face 113*a* and an outer panel 114*a* having an inner face 115*a*. The inner face 113*a* of the inner panel 112*a* may include one or more recesses 113*r* to define an opening 118*a* to accommodate and enclose an electrical heating element (not shown in FIG. 3F). Further, the inner face 115*a* of the outer panel 114*a* may include one or more recesses 115*r* to define the opening 118*a* to accommodate and enclose the electrical heating element. As will be understood the shape of the one or more recesses 113*r* and the one or more recesses 115*r* may be identical to each other. Further, a thickness $t_{1a}$ of the inner panel 112*a* may be the same or different than a thickness $t_{2a}$ of the outer panel 114*a*. In some examples, the thickness $t_{1a}$ of inner panel 112*a* is the same as the thickness $t_{2a}$ of outer panel 114*a*. In other examples, the thickness $t_{1a}$ of inner panel 112*a* is less than the thickness $t_{2a}$ of outer panel 114*a*. In yet other examples, the thickness $t_{1a}$ of inner panel 112*a* is greater than the thickness $t_{2a}$ of outer panel 114*a*.

Figure 3G:
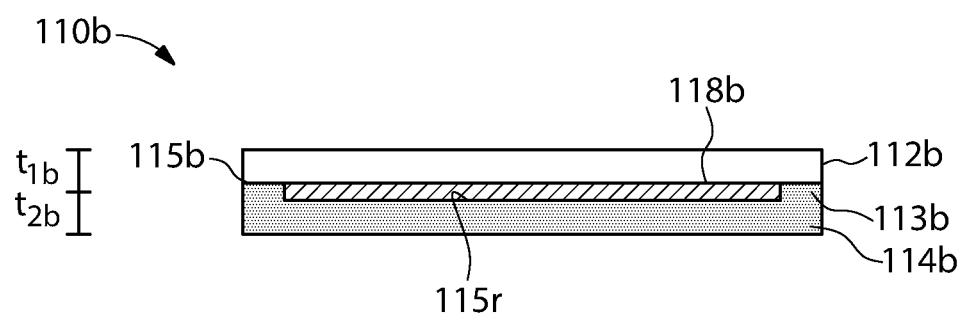
FIG. 3G illustrates a yet another cross-sectional view of the floor system, in accordance with an illustrative configuration of the present disclosure.

Referring now to FIG. 3G, a cross-sectional view 300E of a floor system 110*b* is illustrated, in accordance with yet another configuration of the present disclosure. The floor system 110*b* may include an inner panel 112*b* having an inner face 113*b* and an outer panel 114*b* having an inner face 115b. As shown in FIG. 3G, the inner face 115b of the outer panel 114b may include one or more recesses 115r to define an opening 118b to accommodate and enclose the electrical heating element (not shown). As such, as shown in FIG. 3G, the inner panel 112b has a substantially planar inner face 113b, while the second inner face 115b of the outer panel 114b includes recess 115r. The thickness $t_{1b}$ of the inner panel 112b may be the same or different than the thickness $t_{2b}$ of outer panel 114b. In the configuration, as shown in FIG. 3G, the thickness $t_{2b}$ of outer panel 114b may be greater than the thickness $t_{1a}$ of inner panel 112b.

In one configuration, the floor electrical heating element 116 may be chosen from a resistive electrical heating element and an infrared (IR) electrical heating element. As such, the floor electrical heating element 116 may be connected to ground-fault protected electrical outlets for the electrical supply. The floor electrical heating element 116 may be configured to generate heat and therefore control the temperature within the internal portion 105. In some configurations, the floor electrical heating element 116 may be configured to maintain the temperature within a range of 32 degrees to 70 degrees. In some configurations, the temperature within the internal portion 105 may be maintained at a predetermined temperature range based on a predetermined temperature setting. For example, the predetermined temperature range may be one of: above 32° F. (0° C.), above 35° F. (2° C.), above 40° F. (4° C.), above 45° F. (7° C.), above 50° F. (10° C.), above 55° F. (13° C.), above 60° F. (16° C.), or above 65° F. (18° C.). In some configurations, the floor electrical heating element 116 may be a self-regulating heating cable that automatically adjusts heat output according to ambient temperature and does not require a temperature controller. Alternately, the floor electrical heating element 116 may include a separate temperature controller that may cause to adjust heat output according to the ambient temperature.

Referring now to FIG. 4A, an exploded view of the side wall system 130 for the protective enclosure 100 is illustrated, in accordance with an illustrative configuration of the present disclosure. It should be noted that the side wall system 130 is representative of both the left side wall system 130 and the right side wall system 135 disposed opposite from the left side wall system 130. As such, each side wall system 130, 135 may include an inner panel 132 and an outer panel 134. Further, the left side wall system 130 and the right side wall system 135 may include a wall electrical heating element 136. Therefore, in one configuration, only the left side wall system 130 may include the wall electrical heating element 136. In another configuration, only the right side wall system 135 may include the wall electrical heating element 136. In yet another configuration, both the left side wall system 130 and the right side wall system 135 may include the wall electrical heating element 136.

In some configurations, the wall electrical heating element 136 may be disposed between the respective inner panel 132 and the outer panel 134 of the side wall system 130, 135. The wall electrical heating element 136 may run through channels (not shown in FIG. 4A) similarly as in any of the configurations of the floor system 110 as shown in FIGS. 3C-3E. Further, the inner panel 132 and the outer panel 134 may sandwich or otherwise enclose the wall electrical heating element 136.

The side wall system 130, 135 may further include top and bottom angle irons 138A for assembling the side wall system 130, 135 using a plurality of fasteners 139A. The angle irons 138A may further hold the ceiling system 180 in place. For example, the fasteners 139A may include screws, nut-bolt assemblies, rivets, etc. As will be understood, the ceiling system 180 may form an upper surface of internal portion 105. The internal portion 105 may be separate from an attic portion defined between the ceiling system 180 and the roof system 120. The attic portion may house the electrical box 148 or be positioned on the upper portion of the rear wall system.

In some configurations, the electrical heating elements, i.e. the floor electrical heating element 116 and the wall electrical heating element 136 may be configured to direct heat inwardly from the floor system 110 and the at least one wall system 130, 135 to warm (i.e., increase the temperature) the internal portion 105 of the protective enclosure 100.

It should be noted that, similar to the inner panel 112 and the outer panel 114 of the floor system 110 described above, the inner panel 132 and the outer panel 134 of side wall system 130, 135, as well as the other systems described below, may be made of the same material or may be made of different materials. Further, similar to the inner panel 112 and the outer panel 114, the thickness of the inner panel 132 may be the same or different than the thickness of outer panel 134.

Figure 5:
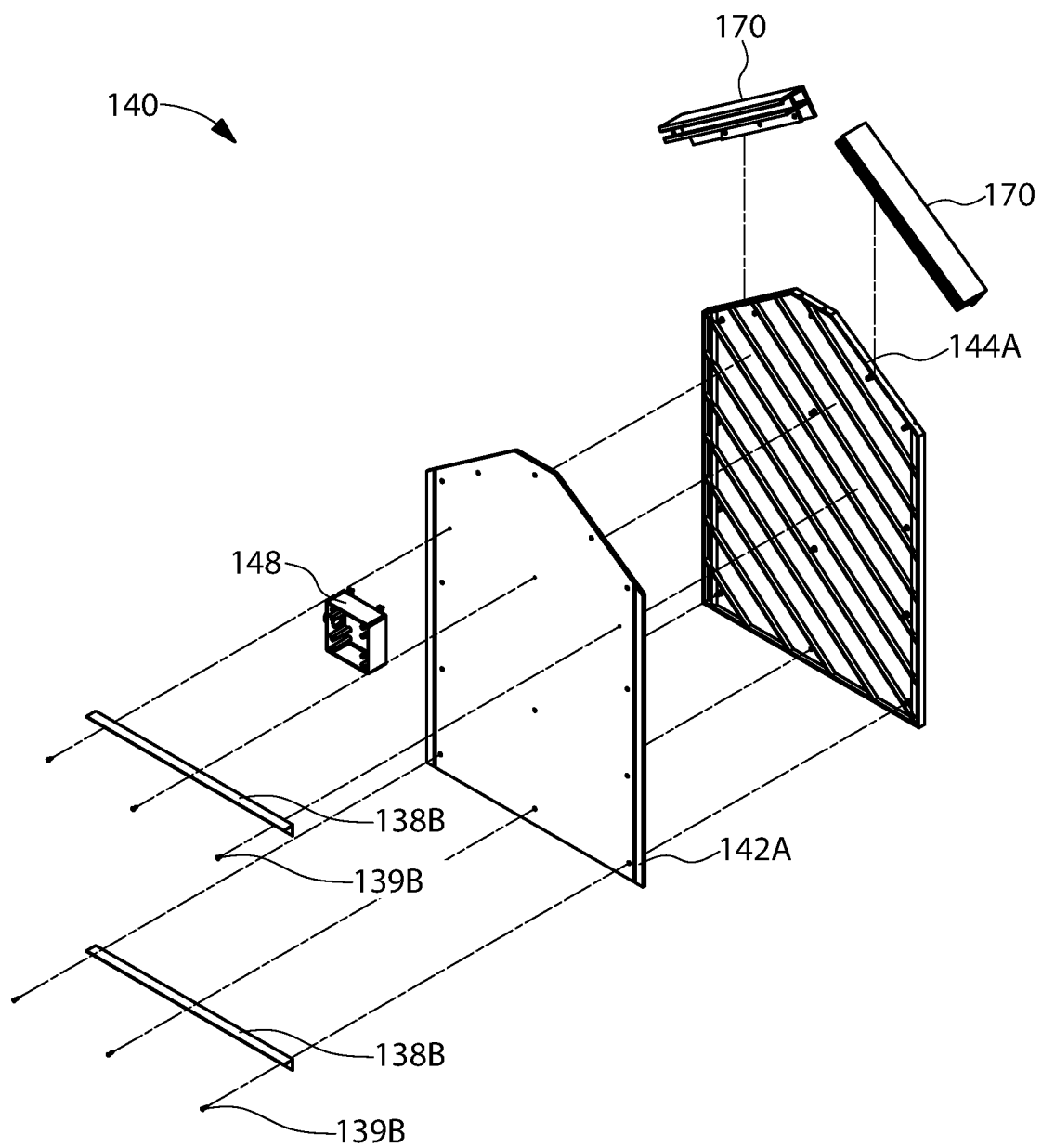
FIG. 5 illustrates an exploded view of a rear wall system for the protective enclosure, in accordance with an illustrative configuration of the present disclosure.

Referring now to FIG. 4B, a perspective view 400B of the assembled side wall system 130 for the protective enclosure 100 of FIG. 4A is illustrated. Further, FIG. 4C illustrates a magnified view 400C of a detail C of FIG. 4B (i.e. the corner section of the side wall system 130). As it can be seen in FIG. 4C, the wall electrical heating element 136 may include the trace extender 137 which may extend through the side wall system 130 to be connected to the electrical box 148 which is shown in FIG. 5. Further, in some configurations, the side wall system 130 may include a through hole or a pathway (not shown in FIG. 4A) similar to the cut-out 119 of FIG. 3A. The through hole or pathway may therefore allow the wall electrical heating element 136 to be electrically connected to the electrical box 148 (housed in the attic portion) via the trace extender 137 and the through hole or the pathway.

Referring now to FIG. 5, an exploded view 500 a rear wall system 140 for protective enclosure 100 is illustrated, in accordance with an illustrative configuration of the present disclosure. The rear wall system 140 may include an inner panel 142A and an outer panel 144A. Further, in some configurations, the rear wall system 140 may include a rear wall electrical heating element (not shown) disposed between the inner panel 142A and the outer panel 144A. The rear wall electrical heating element may run through channels (not shown in FIG. 5) in a manner similar to any of the configurations shown in FIGS. 3B-3D. The rear wall system 140 may further include top and bottom angle irons 138B for assembling the rear wall system 140 with a plurality of fasteners 139B. The rear wall system 140 additionally may include first and second roof posts 170. The first and second roof posts 170 may be used to mount the roof system 120 on the rear wall system 140. Further, in some configurations, the electrical box 148 may be fitted to the rear wall system 140.

Figure 6:
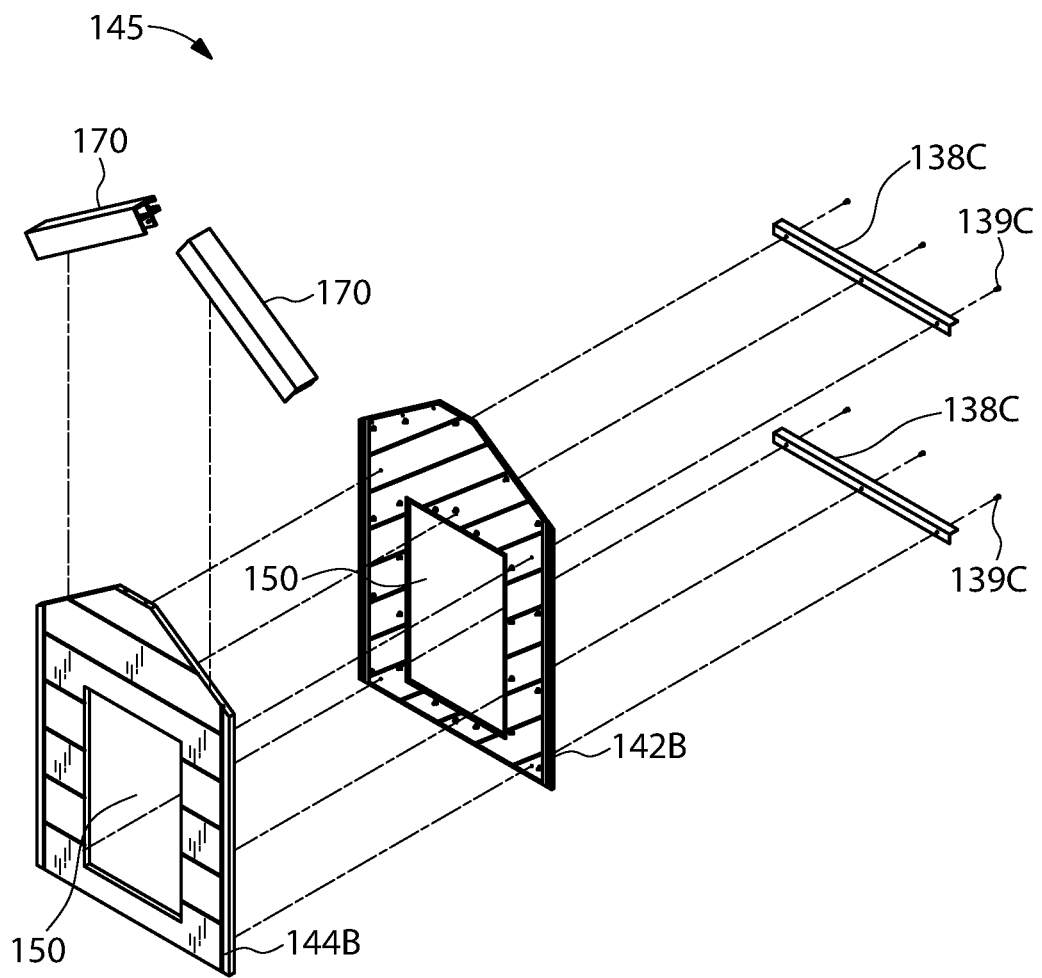
FIG. 6 illustrates an exploded view of the front wall system for the protective enclosure, in accordance with an illustrative configuration of the present disclosure.

Referring now to FIG. 6, an exploded view of the front wall system 145 for protective enclosure 100 is illustrated, in accordance with an illustrative configuration of the present disclosure. The front wall system 145 may be positioned opposite to the rear wall system 140. As with the rear wall system 140, the front wall system 145 may include an inner panel 142B and an outer panel 144B. In some configurations, the front wall system 145 may optionally include a front wall electrical heating element (not shown in FIG. 6) disposed between the inner panel 142B and the outer panel 144B. The front wall electrical heating element may run through channels (not shown in FIG. 6) similarly as in any of the configurations as shown in FIGS. 3B-3D. The inner panel 142B and the outer panel 144B of the front wall system 145 may further include an opening 150 for providing an entry as well as egress for the pet using the protective enclosure 100. The front wall system 145 may further include top and bottom angle irons 138C for assembling the front wall system 145 using a plurality of fasteners 139C.

Referring now to FIG. 7, a perspective view of the corner post 155 for the protective enclosure 100 is illustrated, in accordance with an illustrative configuration of the present disclosure. The corner post 155 may include corner post brackets 158. The corner post brackets 158 may be provided for positioning a wall system (e.g. rear wall system 140) The corner post 155 may be assembled using fasteners 139D for assembly. The corner post 155 may further include channels or openings that may be utilized to accommodate electrical connection pathways to connect the floor electrical heating element 116 or the wall electrical heating element 136 to the electrical box 148.

With reference to FIG. 8, a perspective view of the roof post 170 for the protective enclosure 100 is illustrated, in accordance with an illustrative configuration of the present disclosure. The roof post 170 may include a roof post bracket 172. The roof post bracket 172 may be provided for positioning a wall system and a roof system (e.g. rear wall system 140 and side wall system 130 or 135) The roof post 170 may be assembled using fasteners 139E for assembly.

With reference to FIG. 9, a perspective view of a roof cover system 175 for the protective enclosure 100 is illustrated, in accordance with an illustrative configuration of the present disclosure. The roof cover system 175 may include first and second roof cover caps 176. The first and the second roof cover caps 176 may be configured to be fitted to the extreme ends of the roof cover system 175 to cover these extreme ends. The roof cover system 175 may be assembled using fasteners 139F for assembly.

Figure 10A:
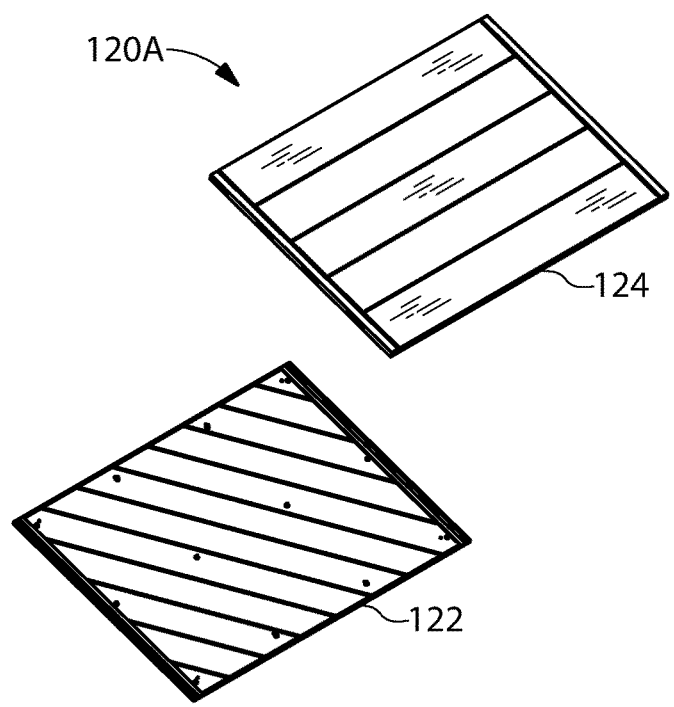
FIG. 10A illustrates an exploded view of a first set of panels of a roof system, in accordance with an illustrative configuration of the present disclosure.

Referring now to FIG. 10A, an exploded view of a first set of roof panels 120A of the roof system 120 is illustrated, in accordance with an illustrative configuration of the present disclosure. The roof system 120 may include a first set of roof panels 120A and a second set of roof panels 120B. It should be noted that the first of roof panels 120A as shown in FIG. 10A is also representative of the second set of roof panels 120B. Each of the first set of roof panels 120A and the second set of roof panels 120B may include an inner roof panel 122 and an outer roof panel 124. The two sets (i.e. the first set of roof panels 120A and the second set of roof panels 120B) may be arranged to make a roof peak for connecting with the roof post 170. The peak may be covered with the roof cover system 175. In some configurations, the roof system 120 may optionally include a roof electrical heating element (not shown in FIG. 10A) disposed between the inner roof panel 122 and the outer roof panel 124 that may run through channels similarly as in any of the configurations as shown in FIGS. 3B-3D.

Figure 10B:
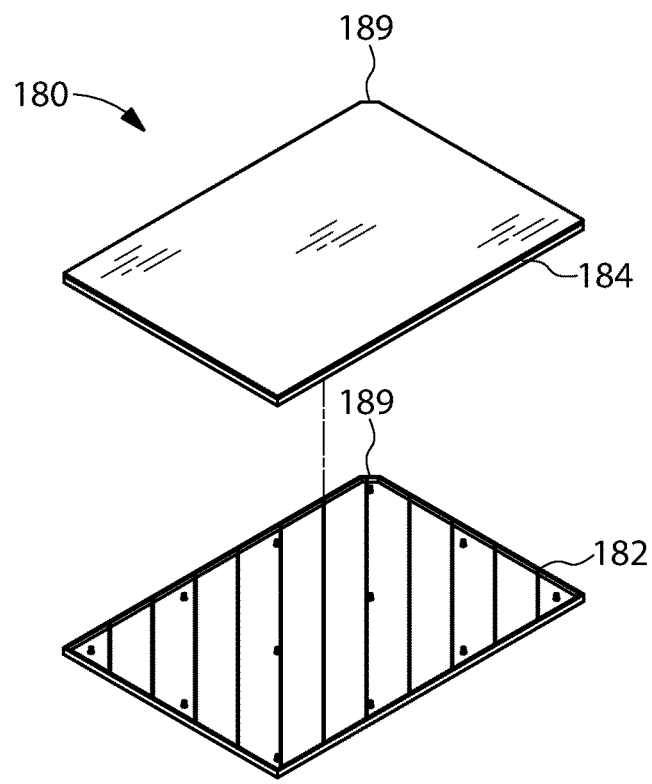
FIG. 10B illustrates an exploded view of a ceiling system, in accordance with an illustrative configuration of the present disclosure.

Referring now to FIG. 10B, an exploded view of the ceiling system 180 is illustrated, in accordance with an illustrative configuration of the present disclosure. The ceiling system 180 may include an inner ceiling panel 182 and an outer ceiling panel 184. In some configurations, the ceiling system 180 may optionally include a ceiling electrical heating element (not shown in FIG. 10B) disposed between the inner ceiling panel 182 and the outer ceiling panel 184 that may run through channels similarly as in any of the configurations as shown in FIGS. 3B-3D. To this end, each of the inner ceiling panel 182 and the outer ceiling panel 184 may include a cut-out 189 on any of the corners. The ceiling electrical heating element may include a trace extender extending through the cut-out 189 and to the electrical box 148.

In some configurations, the protective enclosure 100 may include a first electrical heating element and a second electrical heating element. The first electrical heating element may be disposed within at least the floor electrical heating element 116, at least one wall system 136 and the ceiling system. The second electrical heating element may be disposed within at least one of the floor system, at least one wall electrical heating element 136 of the left side wall system 130 or the right side wall system 135, or the rear wall electrical heating element, and/or the front wall electrical heating element, or the ceiling electrical heating element. As such, the first electrical heating element and the second electrical heating element may be configured to be connected to the electrical box 148 provided on the rear wall system 140. The first electrical heating element and the second electrical heating element provide for raising or lowering temperature in the internal portion 105 by regulation within the electrical box 148. The electrical box 148 may be connected to an electrical power source for providing power to the first electrical heating element and the second electrical heating element of the protective enclosure 100.

It should be noted that while electrical box 148 is shown as part of rear wall system 140, the electrical box 148 may be however positioned at other locations or within other systems of protective enclosure 100. As such, the electrical box 148 is not limited to being located in the rear wall system 140. As mentioned above, the plurality of electrical heating elements may be connected to the electrical box 148 which includes a plug for connecting to the power source. The power source may be a low voltage DC power source. The electrical box 148 may further include an outdoor cord along with the plug for connecting to the electrical power source. The electrical box 148 may further be connected to a ground-fault protected outlet using a 6-foot cord or cable (not shown), or an 8-foot cord or cable or longer, including the plug for connection to the electrical power source. In some configurations, the electrical power source may be a wall outlet or a portable generator for providing electricity to the first and the second electrical heating element via the electrical box 148. The electrical box 148 may include a circuit breaker with a 30-mA trip level, for example.

The electrical box 148 is positioned in an attic area space above ceiling system 180 to prevent contact with the animal inside protective enclosure 100, and it is from electrical box 148 that the current is distributed to the floor system 110 and/or the at least one wall or ceiling system chosen from side wall system 130, rear wall system 140, front wall system 145, and ceiling system 180.

In some configurations, the protective enclosure 100 may be powered by solar panels installed on the roof system 120 for powering the first and the second electrical heating elements. As such, a connection to a wall outlet or another power source is not required as the protective enclosure 100 is a self-powered stand-alone device, i.e., and therefore no electrical box 148 is required.

In some configurations, the first and the second electrical heating elements used for the protective enclosure 100 may automatically adjust the heat output based on the ambient temperature. To this end, for example, the first and the second electrical heating elements may include RAYCHEM® self-regulating heating cable. Alternatively, the first and the second electrical heating elements may be controllable by a smart thermostat having a Wi-Fi or wired internet connection. The smart thermostat may be controlled via an application on a smartphone or tablet computer. The smart thermostat may be provided along with the electrical box 148 and positioned in the attic portion or upper portion of the protective enclosure.

In some configurations, the temperature within the internal portion 105 of the protective enclosure may be maintained at a predetermined temperature range based on a predetermined temperature setting. The predetermined temperature range may be one of above 32° F. (0° C.), above 35° F. (2° C.), above 40° F. (4° C.), above 45° F. (7° C.), above 50° F. (10° C.), above 55° F. (13° C.), above 60° F. (16° C.), or above 65° F. (18° C.). Further, in some configurations, the temperature within the internal portion 105 may be maintained from 40° F. (4° C.) to 85° F. (29° C.), or from 50° F. (10° C.) to 75° F. (24° C.), or from 55° F. (13° C.) to 70° F. (21° C.). Furthermore, in some configurations, the temperature within the internal portion 105 may be maintained from 32° F. (0° C.) to 70° F. (21° C.). In some configurations, the protective enclosure 100 may be self-regulating and no temperature controller or thermostat may be necessary.

In some configurations, the protective enclosure 100 may further include at least one sensor. The at least one sensor may be configured to detect a presence of the animal or an absence of the animal within the internal portion 105 of the protective enclosure 100. The sensor may be further configured to generate a signal indicative of the presence or the absence of the animal within the internal portion of the protective enclosure. Further, the sensor may be configured to transmit the signal to at least one of the first electrical heating element and the second electrical heating element. The signal indicative of the presence of the animal within the internal portion 105 is configured to activate at least a portion of the array of the floor electrical heating element or the at least a portion of the array of the at least one wall electrical heating element. Further, the signal indicative of the absence of the animal within the internal portion may be configured to deactivate at least a portion of the array of the floor electrical heating element and the at least a portion of the array of the at least one wall electrical heating element. In other words, the sensor may cause to activate at least a portion of the array of the first electrical heating element and the second electrical heating element depending on whether the animal is present inside the internal portion 105 or not.

As will be appreciated, the sensor, therefore, provides energy efficiency as the electrical heating elements may be only activated as needed when the animal is using the protective enclosure. By way of example, the sensor may be a motion sensor, a pressure sensor, a heat sensor, an infrared (IR) sensor, a passive infrared (PIR) sensor, a capacitive touch screen to sense movement, or a radio-frequency identification (RFID) sensor. The RFID sensor may be configured to pair with a RFID tag system with a chip. This RFID tag system may be configured to be located on the animal's collar. The RFID sensors and the RFID tag system may help with location detection of the animal.

In some configurations, some or all of the floor electrical heating element 116 and the wall electrical heating element (i.e. the side wall electrical heating element 136, or the rear wall electrical heating element, or the front wall electrical heating element), or the ceiling or roof electrical heating element may include an array of electrical heating elements. Further, in some configurations, the sensor may be an array of sensors. The array of electrical heating elements and the array of sensors may be associated with a grid location. As such, the sensor may activate all of the array or only a portion of the array of the electrical heating elements where the animal/dog is positioned according to the grid location. In other words, if the array of electrical heating elements in the floor system includes associated pressure sensors therein, the sensors can signal only those arrays of the electrical heating elements in that grid location to activate. In some configurations, the electrical heating elements may include an array of electrical heating elements and a plurality of sensors associated with a grid location for the array of electrical heating elements. The plurality of sensors may be configured to send a signal to activate at least a portion of the array of electrical heating elements upon detecting the animal's presence. For example, a pet may be tucked toward the rear wall system 140 of the protective enclosure 100, and therefore, only the portion of the floor system 110 the pet is in contact with will activate to provide heat to the animal. In configurations using a pressure sensor or a plurality of pressure sensors, for example, the pressure sensors may be positioned within the floor system 110 to detect the presence or absence of the animal. In alternate or additional configurations, the sensors (for example, RFID sensor) may be positioned within the ceiling system 180. Therefore, the heat generated by the electrical heating elements may be emitted through the inner panels and directed to the internal portion 105 selectively based upon the pet's positioning within the enclosure. This ensures maximum energy efficiency of protective enclosure 100.

The protective enclosure 100 may be dimensionally consistent with those of conventional dog houses in terms of available space for the animal within the internal portion 105. As mentioned above, the internal portion 105 of the protective enclosure 100 may be defined by the floor system 110, the side wall systems 130, 135, the rear wall system 140, the front wall system 145, the ceiling system 180, or the roof system 120. The protective enclosure 100 may be any size that appropriately provides the animal a room to turn around and to enter and exit freely. The appropriate dimensions include a height from the floor system 110 to the ceiling system 180 that is from about 25% to about 50% greater than the height from the animal's toes to the top of the head. Further, the appropriate dimensions include a width and a length of the internal portion 105 that is from about 10% to about 50% the length from the animal's nose to the flank of the animal, not including tail. In some configurations, the internal portion 105 may have a width in the range of about 25 inches to about 45 inches, a length in the range of about 28 inches to about 42 inches, and a height in the range of about 20 inches to about 30 inches. In other configurations, the internal portion 105 may have a width in the range of about 30 inches to about 40 inches, a length in the range of about 28 inches to about 32 inches, and a height in the range of about 30 inches to about 34 inches. It may be understood that the height of the internal portion 105 may be measured from floor system 110 to the ceiling system 180 and may not include the attic portion peaked above the ceiling system 180. The attic portion may additionally add about 15 inches to 25 inches to the total height of the protective enclosure 100. Custom sizes may be able to be manufactured that are tailored to specific pet animal owner needs.

Figure 11A:
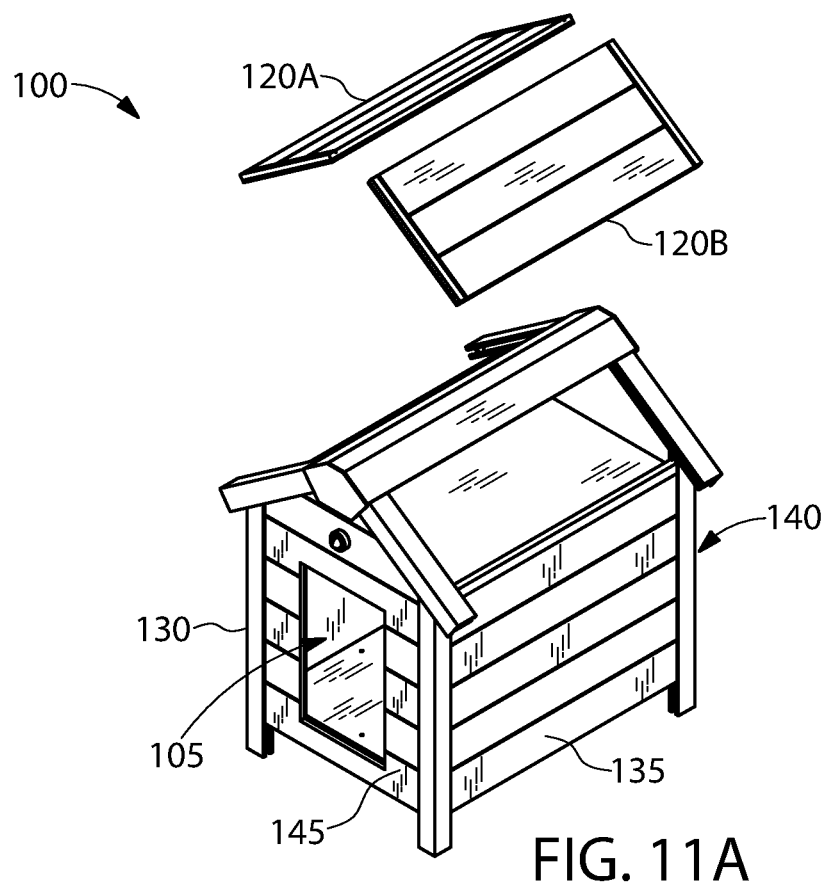
FIGS. 11A-11B illustrate some more perspective views of the protective enclosure, in accordance with one configuration of the present disclosure.
Figure 11B:
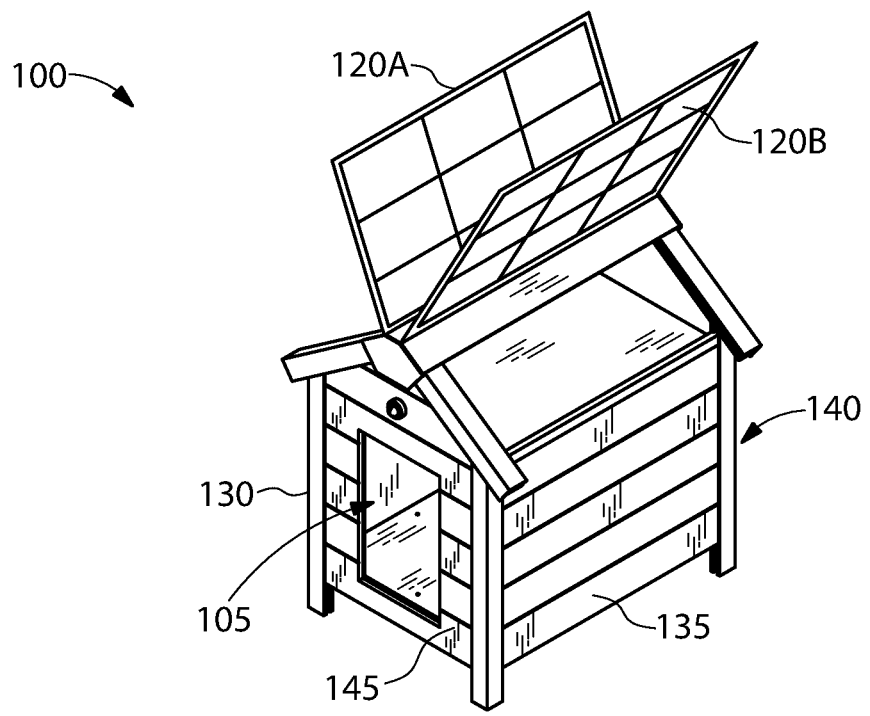

Referring now to FIG. 11A, a perspective view of the protective enclosure 100 of the FIG. 1 is illustrated, in accordance with one configuration of the present disclosure. One of the first set of roof panels 120A and the second set of roof panels 120B of the and roof system 120 may be removable, to allow easy cleaning of the internal portion 105 of the protective enclosure 100. In some configurations, as shown in FIG. 11A, at least of the first set of roof panels 120A and the second set of roof panels 120B can be completely disengaged from the rest of the protective enclosure 100. Once the cleaning of the internal portion 105 is complete, the at least one of the first set of roof panels 120A and the second set of roof panels 120B can be again assembled with the rest of the protective enclosure 100. FIG. 11B shows a perspective view of the protective enclosure 100 of the FIG. 1 is illustrated, in accordance with another configuration of the present disclosure. In this configuration, the at least one of the first set of roof panels 120A and the second set of roof panels 120B may be coupled to the rear wall system 140 and the front wall system via a hinged connection. As such, the at least one set of roof panels 120A, 120B may be rotated about the hinged connection to access and therefore clean the internal portion 105 of the protective enclosure 100.

It should be noted that although the internal portion 105 of protective enclosure 100 is shown in the shape of a rectangular cuboid in the FIG. 1, however, other shapes may also be contemplated that may be made from the moldable materials, as discussed above. For example, the other shapes may include a cube, a cylinder, a pyramid, a frustum of a pyramid, a cone, a frustum of a cone, a zone of a sphere, or a segment of a sphere, and the like.

Figure 12A:
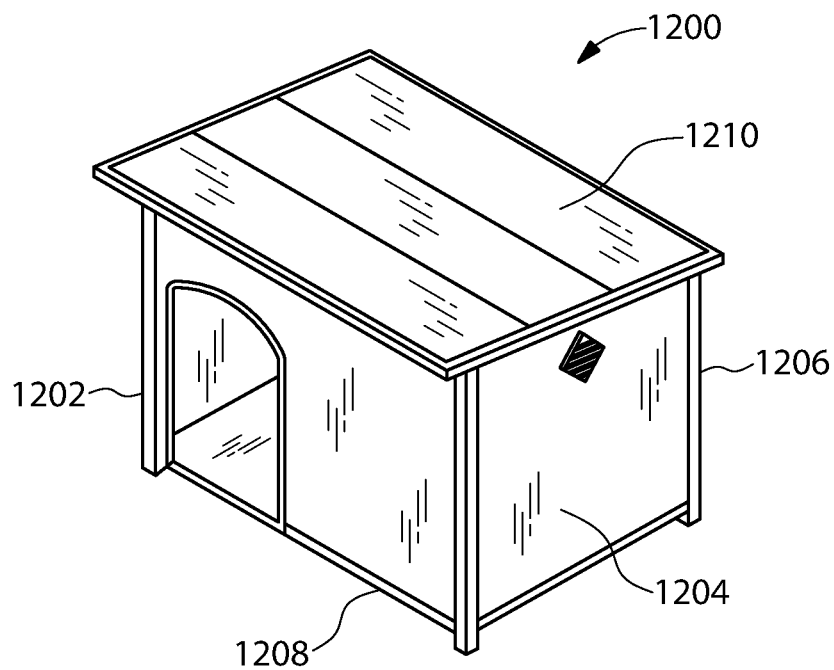
FIG. 12A illustrates a perspective view of the protective enclosure in a first condition, in accordance with another configuration of the present disclosure.
Figure 12B:
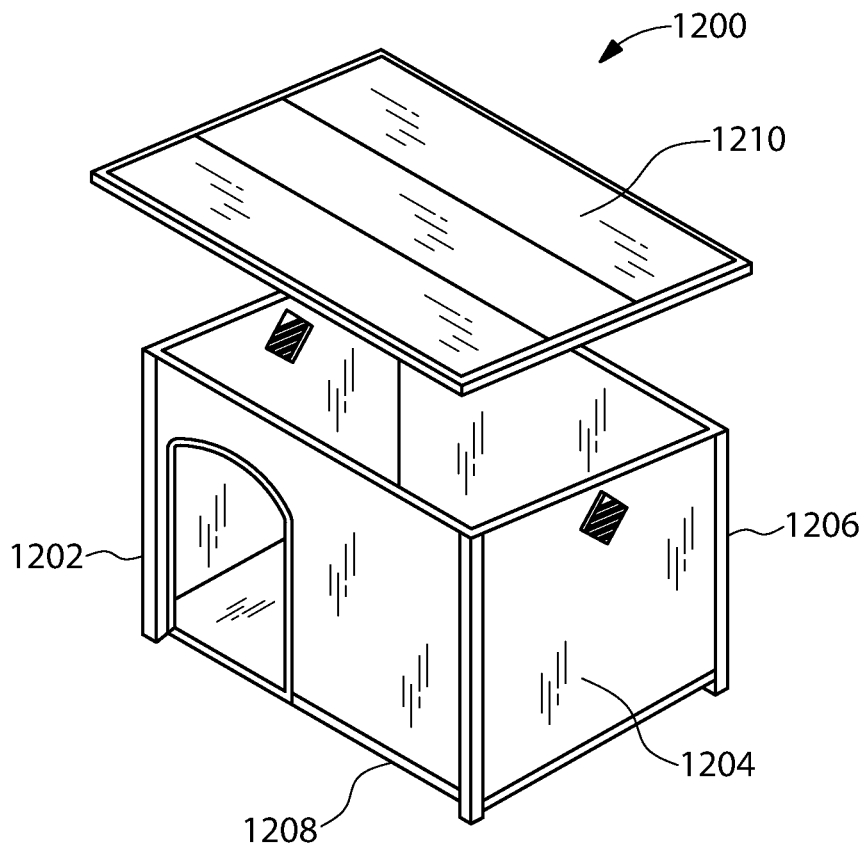
FIG. 12B illustrates a perspective view of the protective enclosure of FIG. 12A in a second condition, in accordance with another configuration of the present disclosure.

Referring now to FIG. 12A, a perspective view of a protective enclosure 1200 is illustrated, in accordance with another configuration of the present disclosure. As shown in FIG. 12, the protective enclosure 1200 has a single roof system 1210, i.e. a single set of panels 1210. The roof system 1210 may have a flat planar configuration and may be positioned on top of a side wall system 1202, 1204, a rear wall system 1206, and a front wall system 1208. Further, in some configurations, the roof system 1210 may be removable by completely disengaging from the rest of the protective enclosure 1200, in order to access and clean an internal portion of the protective enclosure 1200. FIG. 12A shows the protective enclosure 1200 in a first condition, in which the roof system 1210 is fixed to the rest of the protective enclosure 1200, i.e. the side wall system 1202, 1204, the rear wall system 1206, or the front wall system 1208. FIG. 12B shows the protective enclosure 1200 in a second condition, in which the roof system 1210A is removed from the rest of the protective enclosure 1200, i.e. the side wall system 1202, 1204, the rear wall system 1206, or the front wall system 1208.

Figure 13:
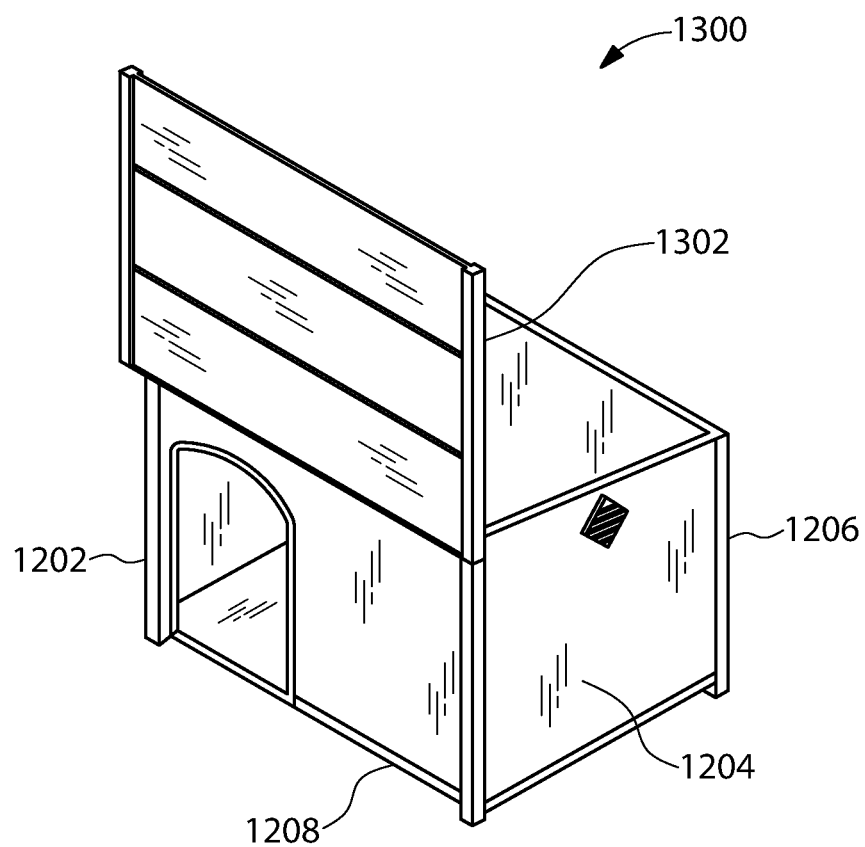
FIG. 13 illustrates a perspective view of another protective enclosure, in accordance with another configuration of the present disclosure.

Referring now to FIG. 13, a perspective view of another protective enclosure 1300 is illustrated, in accordance with another configuration of the present disclosure. As shown in FIG. 13, the protective enclosure 1300 has a single roof member 1302, i.e. a single set of panels 1302 which may be coupled via a hinged connection to one of the side wall systems 1202, 1204, the rear wall system 1206, or the front wall system 1208. The roof member 1302 may be rotated about the hinged connection to gain access and clean an internal portion of the protective enclosure 1300.

Figure 14:
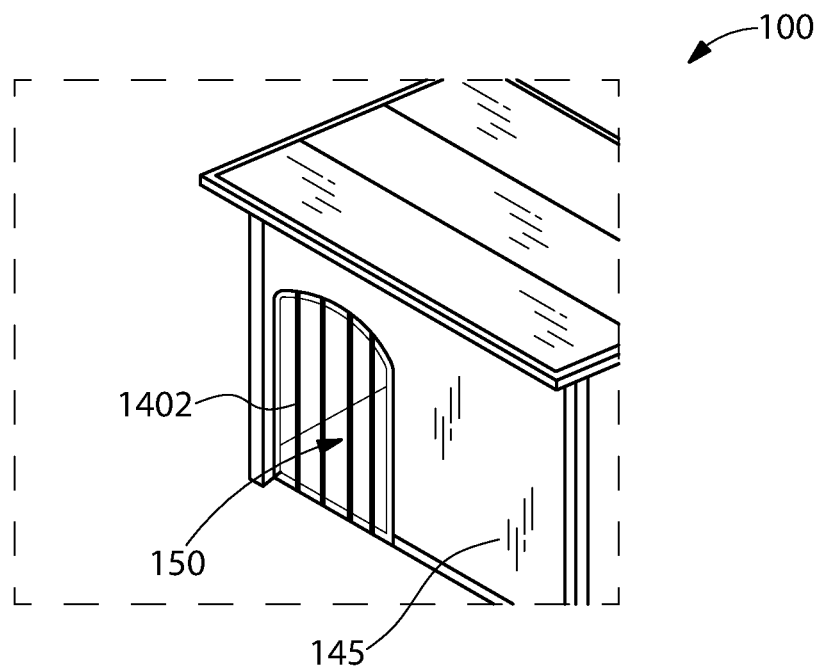
FIG. 14 illustrates a perspective view of a section of the protective enclosure of FIG. 1, in accordance with a configuration of the present disclosure.

Referring now to FIG. 14, a perspective view of a section of the protective enclosure 100 is illustrated, in accordance with another configuration of the present disclosure. As shown in FIG. 14, the protective enclosure 100 may include the opening 150, for example on the front wall system 145, for the pet's entry and exit from the protective enclosure 100. The opening 150 may include a covering such as a flap door 1402. The flap door 1402 may be made of vinyl or other flexible plastic or fabric and may be optional and removable. The flap door 1402 may be permeable to allow air flow or just one piece with magnet strips at the bottom portion to keep it in place in order to avoid heat loss.

Figure 15:
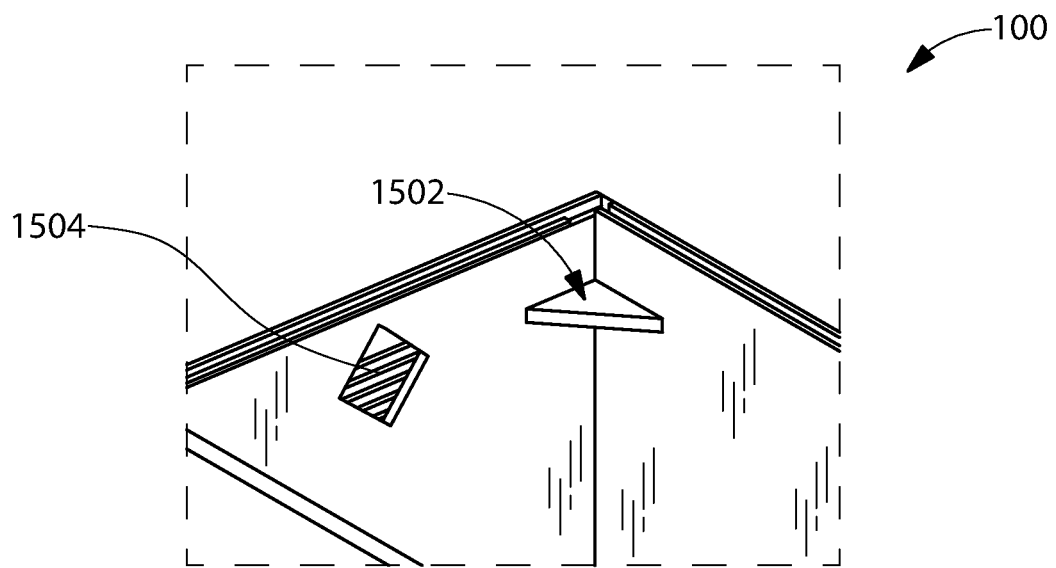
FIG. 15 illustrates a perspective view of another section of the protective enclosure of FIG. 1, in accordance with another configuration of the present disclosure.

In some configurations, the protective enclosure 100 may include at least one imaging device, for example, a camera. Referring now to FIG. 15, a perspective view of another section of the protective enclosure 100 is illustrated, in accordance with another configuration of the present disclosure. As shown in FIG. 15, the protective enclosure 100 may include a shelf 1502. In some configurations, the shelf 1502 may be used to support a first imaging device which is configured to capture images from the inside of the internal portion 105 of the protective enclosure 100. The shelf 1502, for example, may be provided on a corner on two adjacent wall systems. Referring back to FIG. 1, in some configuration, a second imaging device 190 may be provided on the front wall system 145 of the protective enclosure 100. The second imaging device 190 may therefore be configured to capture still images or videos from a region outside the protective enclosure to record the activities of the animal. Further, in some configurations, the front wall system 145 or the rear wall system 140 may include a molded receptacle and a fastener for receiving the second imaging device.

The at least one imaging device may be directly, remotely, or wirelessly connected to the electrical box 148. The imaging device may be a two-way internet protocol (IP) camera which allows the pet owner to view and interact with the pet while away from home through a smartphone using a mobile app available for Android and IOS devices or any other operating system. The imaging device may be a two-way internet protocol (IP) camera or a home security camera having Wi-Fi or wired internet connection. The imaging device may be powered by electricity. To this end, the imaging device may be connected to the electrical box 148. For example, a Universal Serial Bus (USB) connector may connect to the imaging device.

With reference again to FIG. 15, as shown, the protective enclosure 100 may include at least one vent 1504. For example, the protective enclosure 100 may include one vent 1504 on each of the left side wall system 130 and the right side wall system 135. Alternately, the protective enclosure 100 may include one vent 1504 on either of the left side wall system 130 or the right side wall system 135. The vent 1504 may include a cut-out region in the wall system, and optionally including a grill to prevent ingress of insects, birds, etc. As will be understood, the vent may be provided for a better exchange of breathable air for the animal inside the protective enclosure 100.

Figure 16:
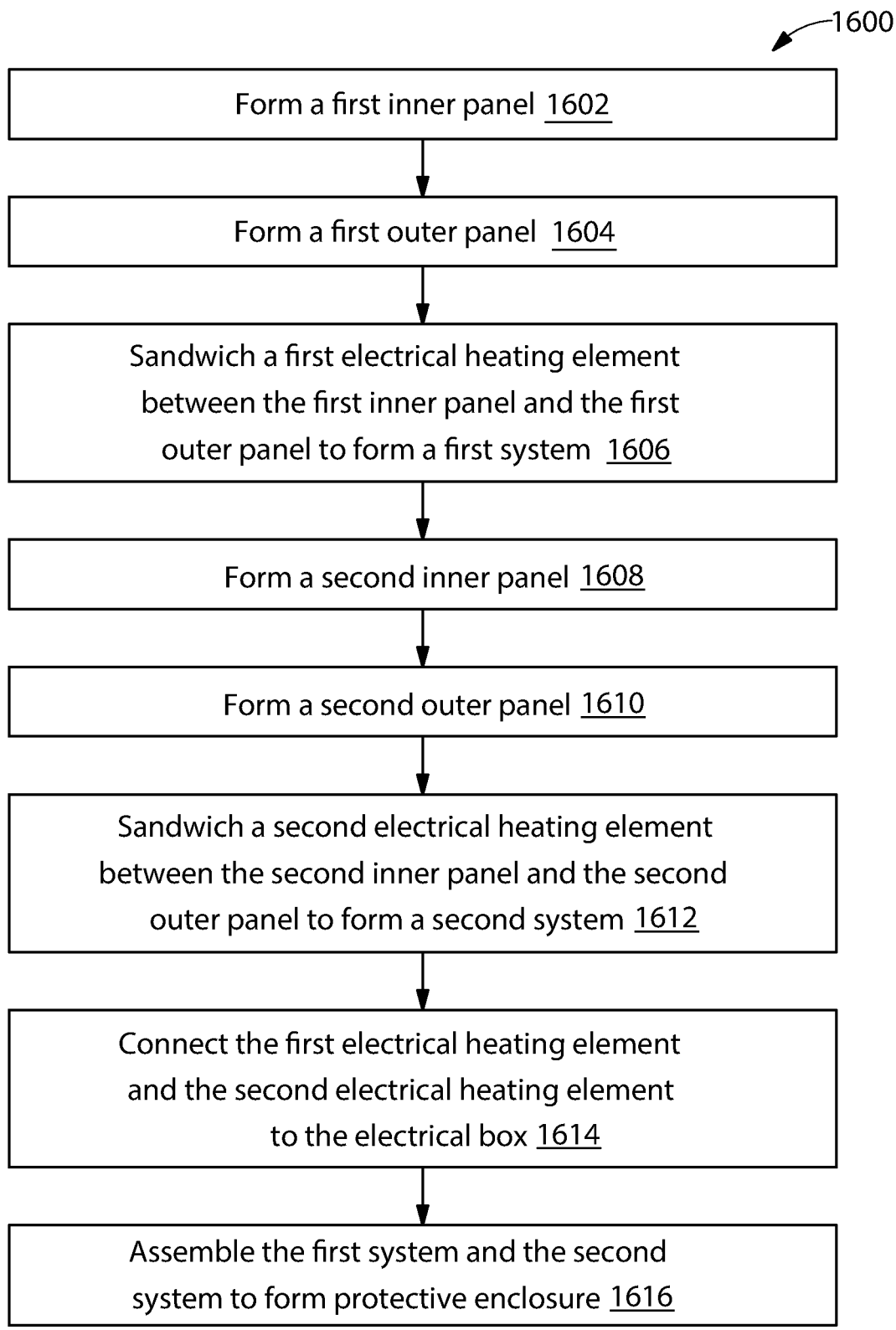
FIG. 16 is a flow chart of a method of manufacture for the protective enclosure, in accordance with some configurations of the present disclosure.

Referring now to FIG. 16, a flow chart of a method 1600 of manufacture for the protective enclosure 100 is illustrated, in accordance with some configurations of the present disclosure. At step 1602, a first inner panel may be formed. The first inner panel may be one of any of the systems described herein, for example, the inner panel 112 of the floor system 110, the inner panel 132 of the side wall systems 130, 135, the inner panel 142A of the rear wall system, the inner panel 142B of the front wall system 145, the inner ceiling panel 182 of the ceiling system 180, and the inner roof panel 122 of the roof system 120. As mentioned above, the first inner panel may be mold manufactured, blow molded, extruded, 3D printed, injection molded, or made by other techniques suitable for forming the first inner panel from a heat resistive plastic, thermoplastic, or wood products. The first inner panel may further include an additional material, such as a filler, as described above.

At step 1602, a first outer panel may be formed. The first outer panel may be one of any of the systems described herein, for example, the outer panel 114 of the floor system 110, the outer panel 134 of side wall systems 130, 135, the outer panel 144A of the rear wall system 140, the outer panel 144B of the front wall system 145, the outer ceiling panel 184 of the ceiling system 180, and the outer roof panel 124 of the roof system 120. Similar to the first inner panel, the first outer panel may be mold manufactured, blow molded, extruded, 3D printed, injection molded, or made by other technique suitable for forming the first outer panel of the heat resistive plastic or thermoplastic, which may further include additional material, such as a filler, as described above. The material of the first inner panel and the first outer panel may be the same or different.

At step 1606, a first electrical heating element may be sandwiched between the first inner panel and the first outer panel to form a first system. As will be appreciated, the sandwiching may include embedding or otherwise enclosing the first electrical heating element between the first inner panel and first outer panel in such a way that the first electrical heating element is not in direct contact with the animal for added safety. The first electrical heating element may include the floor electrical heating element 116 or the wall electrical heating elements 136 of the left side wall system 130 or the wall electrical heating elements 136 of the right side wall system 135. Optionally, the first electrical heating element may include the rear wall electrical heating element, the front wall electrical heating element, the ceiling electrical heating element, and the roof electrical heating element. As such, the first system may be one of the floor system 110 and the left side wall system 130, the right side wall system 135, the rear wall system 140, the front wall system 145, the ceiling system 180, and the roof system 120. For example, each of the first inner panel and the first outer panel may include at least one first channel, such that the first electrical heating element may be sandwiched between the first inner panel and the first outer panel via the at least one first channel. Similarly, each of the second inner panel and the second outer panel may include at least one second channel, such that the second electrical heating element may be sandwiched between the second inner panel and the second outer panel via the at least one second channel. The floor electrical heating element 116 may include the trace extender 117 extending from the floor system 110 that is configured to connect the floor electrical heating element 116 with the electrical box 148. To this end, the floor system 110 may include the cut-out 119 configured to allow the trace extender 117 to extend from the floor system 110. In other example configurations, the ceiling system 180 may include a cut-out configured to allow the first electrical heating element and the second electrical heating element to be connected to the electrical box 148 via an electric wire.

At step 1608, a second inner panel may be formed. The second inner panel may be another of any of the systems described above, for example, the inner panel 112 of the floor system 110, the inner panel 132 of the side wall systems 130, 135, the inner panel 142A of the rear wall system, the inner panel 142B of the front wall system 145, the inner ceiling panel 182 of the ceiling system 180, and the inner roof panel 122 of the roof system 120. Similar to the first inner panel, the second inner panel may be mold manufactured, blow molded, extruded, 3D printed, injection molded, or made by other technique suitable for forming the second inner panel from a heat resistive plastic, thermoplastic, or wood products. The second inner panel may further include an additional material, such as a filler, as described above.

At step 1610, a second outer panel may be formed. The second inner panel may be another of any of the systems described above, for example, the outer panel 114 of the floor system 110, the outer panel 134 of side wall systems 130, 135, the outer panel 144A of the rear wall system 140, the outer panel 144B of the front wall system 145, the outer ceiling panel 184 of the ceiling system 180, and the outer roof panel 124 of the roof system 120. Similar to the first outer panel, the second outer panel may be mold manufactured, blow molded, extruded, 3D printed, injection molded, or made by other technique suitable for forming the second outer panel of the heat resistive plastic or thermoplastic, which may further include additional material, such as a filler, as described above. The material of the second inner panel and the second outer panel may be the same or different.

At step 1612, a second electrical heating element may be sandwiched between the second inner panel and the second outer panel to form a second system. As will be appreciated, the sandwiching may include embedding or otherwise enclosing the second electrical heating element between the second inner panel and second outer panel in such a way that the second electrical heating element is not in direct contact with the animal for added safety. The second electrical heating element may include the floor electrical heating element 116 of the floor system 110 or the wall electrical heating elements 136 of the left side wall system 130 or the wall electrical heating elements 136 of the right side wall system 135. Optionally, the second electrical heating element may include the rear wall electrical heating element, the front wall electrical heating element, the ceiling electrical heating element, and the roof electrical heating element. As such, the second system may be another of the floor system 110, the left side wall system 130, the right side wall system 135, the rear wall system 140, the front wall system 145, the ceiling system 180, and the roof system 120.

At step 1614, the first electrical heating element and the second electrical heating element may be connected to the electrical box 148. As mentioned above, the electrical box 148 (as shown in FIG. 5) may be disposed within or attached to any of the described systems. For example, the electrical box 148 may be disposed at an upper portion of rear wall system 140 in order to be far away from internal portion 105. In other words, electrical box 148 may be enclosed in the attic portion defined by the ceiling system 180 and the roof system 120 or placed on the upper portion of the rear wall system 140. Other positioning of the electrical box 148 may also be contemplated such as any location safely isolated from internal portion 105. For example, the electrical box 148 may be positioned at or near the inner roof panel 122 of roof system 120, at or near the outer ceiling panel 184 of ceiling system 180, the inner panel 142 of front wall system 145, provided the positioning of electrical box 148 is in the attic portion defined between ceiling system 180 and roof system 120. At step 1616, the first system and the second system may be assembled to form protective enclosure 100.

By way of one example configuration, the first system may be the floor system 110 and the second system may be one of the left side wall system 130 or the right side wall system 135. As such, the method 1600 may additionally include the step of forming the ceiling system 180 and forming a roof system 120. The ceiling system 180 and the roof system 120 may define the space (attic portion) to house the electrical box 148. Further, the method 1600 may include the step of positioning the electrical box 148 in the space defined by the ceiling system 180 and the roof system 120. The method 1600 may further include the step of forming the rear wall system 140 and forming the front wall system 145. The floor system 110, the side wall system 130, 135, the ceiling system 180, the rear wall system 140, and the front wall system 145 and the roof system 120 may together define the internal portion 105 of the protective enclosure.

Additionally, the method 1600 may further include the step of positioning the imaging device at the rear wall system 140 or the front wall system 145. The rear wall system 140 may include a molded receptacle. The imaging device may be positioned at the rear wall system 140 or front wall system 145 via the molded receptacle using a fastener.

Further in the above configuration, the method 1600 may include the step of providing at least one sensor configured to detect a presence of the animal or an absence of the animal within the internal portion 105 of the protective enclosure 100. The at least one sensor may be further configured to generate a signal indicative of the presence or the absence of the animal within the internal portion of the protective enclosure and transmit the signal to at least one of the floor electrical heating element or the at least one wall electrical heating element. The signal indicative of the presence of the animal within the internal portion may cause to activate at least a portion of the floor electrical heating element 116 or at least a portion of the at least one wall electrical heating element 136. The signal indicative of the absence of the animal within the internal portion 105 may be configured to deactivate at least a portion of the floor electrical heating element 116 or at least a portion of the at least one wall electrical heating element 136. The at least one sensor may be a radio-frequency identification (RFID) sensor which may be configured to pair with the RFID tag system comprising a chip. The RFID tag system may be configured to be located on the animal's collar.

Further in the above configuration, the method 1600 may include the step of providing a temperature sensor configured to detect temperature inside the internal portion 105 of the protective enclosure 100. The temperature sensor may be further configured to regulate the temperature inside the internal portion 105 of the protective enclosure 100. Regulating the temperature may include activating at least a portion of the array of the floor electrical heating element 116 or the at least a portion of the array of the at least one wall electrical heating element 136. Regulating the temperature may further include deactivating at least the portion of the array of the floor electrical heating element 116 or at least the portion of the array of the at least one wall electrical heating element 136, based on the predetermined temperature setting.

In some configurations, the protective enclosure 100, as disclosed above, may be provided as a kit for assembly by the end user. The floor system 110, side wall systems 130, 135, the rear wall system 140, the front wall system 145, the ceiling system 180, and the roof system 120 may each come preassembled. Further, the electrical heating elements may also be pre-embedded, sandwiched, or otherwise enclosed within the respective systems. The protective enclosure assembly kit may include all the components for an easy assembly by an average pet owner and that requires no power tools. The kit components may include each of the systems (the floor system 110, side wall systems 130, 135, the rear wall system 140, the front wall system 145, the ceiling system 180, and the roof system 120) as well as fasteners, the corner posts, the angle irons, and the roof cover. For example, the corner posts 155 and wall systems may be slidably engaged for assembly. Each of the protective enclosure system corners may be numbered to coordinate with the corner posts 155. The wall systems may be easily slidable within the corner posts 155. After the four wall systems (the side wall systems 130, 135, as well as the rear wall system 140 and the front wall system 145) are in place in the corner posts 155, the floor and ceiling systems are placed. Optionally, vents (i.e. the vents 160 as shown in FIG. 2) disposable at the top of side walls can be added and/or later removed for customizing for seasonal climate change. The floor system 110 and the ceiling system 180 are seated into the preinstalled angle irons. As the ceiling system 180 is positioned, the floor electrical heating element 116 may come through a corner cut-out at the labeled corner post 155 so that the assembler (the user) may feed through the floor electrical heating element 116 to be connected to the electrical box 148. The roof systems 120 are then slid onto preinstalled roof posts on the rear wall system 140 and the front wall system 145. The roof systems 120 are installed into the roof posts similarly as the wall systems are installed into the corner posts 155. The assembler may then install the roof cover and tighten it down by hand to the rear wall system 140 and the front wall system 145 via pre-threaded holes. The corner posts 155, the roof post 170, including respective brackets 172 and 158, as well as angle irons 138A, 138B, 138C may be made of plastic or metal. Suitable metals may be selected from aluminum, stainless steel, steel, iron, zinc, copper, lead, alloys thereof and/or combinations thereof. The roof caps may be hand-pressed into the roof cover. A flap door may be installed to prevent wind from entering the internal portion 105 through the opening 150 of the protective enclosure 100. The protective enclosure 100 may be assembled and ready to be connected to a ground-fault circuit interrupter (GFCI) protected outdoor electrical outlet.

Advantageously, the floor system 110, the side wall systems 130, 135, 140, 145, the ceiling system 180, and the roof system 120 do not require installation of radiant heaters. The heat elements disposed between the inner panels and the outer panels emit heat which is directed through the inner panels to provide heat to the internal portion 105 of the protective enclosure 100. The protective enclosure 100 does not rely on any air flow mechanisms or body temperature of the animal. Therefore, protective enclosure 100 is suitable for outdoor use, including in extreme weather conditions.

In some configurations, the protective enclosure 1200, as disclosed in FIGS. 12A and 12B, may be provided with the roof system 1210 and the ceiling system (e.g. ceiling system 180, FIG. 2) configured as a single assembly. In some configurations, a heating element may be incorporated with the roof system 1210, or it may not be incorporated.

It should be noted that by providing for the first/floor electrical heating element at least one wall electrical heating element, the protective enclosure is better able to manage the temperature inside the internal portion, so as to avoid any underheating or overheating. As it will be understood, in extreme cold weather conditions, only the first/floor electrical heating element may not be sufficient to generate enough heat to provide an effective heated environment for the animal. Further, the combination of the first/floor electrical heating element and the at second/least one wall electrical heating element provides for uniform distribution of heat within the protective enclosure 100, thereby avoiding high temperature spots which may cause burn injuries to the animal. Furthermore, the selective heating based on the presence of the animal inside the protective enclosure 100 (by using sensors) may require heating at a high rate which is not attainable by only the first/floor electrical heating element. The combination of the first/electrical heating element and the second/at least one wall electrical heating element 136 provides for such high rate of heating.

Having described several configurations, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

Specific details are given in the above description to provide a thorough understanding of the configurations. However, it is understood that the configurations may be practiced without these specific details. For example, circuits may be shown in block diagrams in order not to obscure the configurations in unnecessary detail. In other instances, well-known circuits, processes, algorithms, structures, and techniques may be shown without unnecessary detail in order to avoid obscuring the configurations.

Also, it is noted that the configurations may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

In the configurations described above, for the purposes of illustration, processes may have been described in a particular order. It should be appreciated that in alternate configurations, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, configurations may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and/or tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred configurations of the disclosed systems, methods, and/or machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A protective enclosure for an animal, the protective enclosure comprising:
   a floor system;
   a plurality of wall systems; and
   wherein the floor system and the plurality of wall systems define an internal portion of the protective enclosure;
   wherein at least one of the plurality of wall systems or the floor system comprises:
     an inner panel;
     an outer panel;
     a channel formed in either the inner panel or the outer panel;
   a first electrical heating element; and
     wherein the first electrical heating element is disposed within the floor system or within one of the plurality of wall systems adjoining the channel;
   wherein the first electrical heating element is powered by electricity and are connectable to a power source; and
   wherein the first electrical heating element is configured to direct heat inwardly from the floor system or the plurality of wall systems to increase temperature inside the internal portion of the protective enclosure.

2. The protective enclosure of claim 1, wherein the plurality of wall systems comprise:
   a left side wall system;
   a right side wall system;
   a rear wall system;
   a front wall system; and
     wherein the left side wall system and the right side wall system are positioned facing opposite to each other; and
     wherein the rear wall system and the front wall system are positioned facing opposite to each other.

3. The protective enclosure of claim 2, further comprising at least one of:
   a ceiling system; and
   a roof system;
   wherein the ceiling system and the roof system define a space between each other.

4. The protective enclosure of claim 3, further comprising:
   an electrical box;
   wherein the electrical box is configured to be positioned in the space defined by the ceiling system and the roof system;
   wherein the electrical box comprises:
     a plug configured to connect to the power source; and
     wherein the first electrical heating element is connectable to the power source via the plug.

5. The protective enclosure of claim 4 further comprising:
   an imaging device connected to the electrical box.

6. The protective enclosure of claim 5, wherein the imaging device is connected to the electrical box directly, remotely, or wirelessly.

7. The protective enclosure of claim 5,
   wherein the imaging device is configured to be positioned at the rear wall system or the front wall system;
   wherein the rear wall system comprises a molded receptacle; and
   wherein the imaging device is positioned at the rear wall system or the front wall system via the molded receptacle using a fastener.

8. The protective enclosure of claim 1, wherein each of the first electrical heating element is one of a resistive electrical heating element and an infrared (IR) electrical heating element.

9. The protective enclosure of claim 1, wherein each of the first electrical heating element comprises an array of electrical heating elements.

10. The protective enclosure of claim 9, further comprising:
at least one sensor configured to detect a presence of the animal or an absence of the animal within the internal portion of the protective enclosure, wherein the at least one sensor is configured to:
generate a signal indicative of the presence or the absence of the animal within the internal portion of the protective enclosure; and
transmit the signal to at least one of the first electrical heating element and at least one wall electrical heating element;
wherein the signal indicative of the presence of the animal within the internal portion is configured to:
activate at least a portion of the array of the first electrical heating element or at least a portion of the array of the at least one wall electrical heating element;
wherein the signal indicative of the absence of the animal within the internal portion is configured to:
deactivate at least a portion of the array of the first electrical heating element and at least a portion of the array of the at least one wall electrical heating element.

11. The protective enclosure of claim 10, wherein a temperature within the internal portion is maintained at a predetermined temperature range based on a predetermined temperature setting, wherein the predetermined temperature range is one of:
above 32° F. (0° C.);
above 35° F. (2° C.);
above 40° F. (4° C.);
above 45° F. (7° C.);
above 50° F. (10° C.);
above 55° F. (13° C.);
above 60° F. (16° C.); and
above 65° F. (18° C.).

12. The protective enclosure of claim 11 further comprising:
a temperature sensor configured to detect temperature inside the internal portion of the protective enclosure.

13. The protective enclosure of claim 12, wherein the temperature sensor is further configured to regulate the temperature inside the internal portion of the protective enclosure;
wherein regulating the temperature comprises:
activating at least a portion of the first electrical heating element; and
deactivating at least a portion of the first electrical heating element, based on the predetermined temperature setting.

14. The protective enclosure of claim 1,
wherein a width of the internal portion ranges between 25 inches to 45 inches;
wherein a length of the internal portion ranges between 28 inches to 42 inches; and
wherein a height of the internal portion ranges between 20 inches to 30 inches.

15. A protective enclosure for an animal, the protective enclosure comprising:
a floor system comprising:
an inner floor panel;
an outer floor panel; and
a floor channel formed in either the inner floor panel or the outer floor panel;
at least one wall system comprising:
an inner panel;
an outer panel; and
a channel formed in either the inner panel or the outer panel; and
a ceiling system;
a first electrical heating element disposed within the floor system adjoining the floor channel;
a second electrical heating element disposed within the at least one wall system adjoining the channel; and
wherein the first electrical heating element and the second electrical heating elements are connectable to an electrical box;
wherein the electrical box is connectable to a power source;
wherein the floor system, the at least one wall system, and the ceiling system define an internal portion; and
wherein a temperature within the internal portion is maintained at a predetermined temperature range based on a predetermined temperature setting.

16. The protective enclosure of claim 15, further comprising:
at least one sensor configured to detect a presence of the animal or an absence of the animal within the internal portion of the protective enclosure, wherein the at least one sensor is configured to:
generate a signal indicative of the presence or the absence of the animal within the internal portion of the protective enclosure; and
transmit the signal to at least one of the first electrical heating element and the second electrical heating element;
wherein the signal indicative of the presence of the animal within the internal portion is configured to:
activate at least a portion of the first electrical heating element or at least a portion of the second electrical heating element;
wherein the signal indicative of the absence of the animal within the internal portion is configured to:
deactivate at least a portion of the first electrical heating element and at least a portion of the second electrical heating element.

17. A protective enclosure for an animal, the protective enclosure comprising:
a floor system;
at least one wall system comprising:
an inner panel;
an outer panel; and
a channel formed in either the inner panel or the outer panel;
at least a first electrical heating element of a plurality of electrical heating elements, the first electrical heating element disposed in the channel of the at least one wall system or the floor system;
at least one sensor configured to detect a presence of the animal or an absence of the animal within an internal portion of the protective enclosure, wherein the at least one sensor is configured to:
generate a signal indicative of the presence or the absence of the animal within the internal portion of the protective enclosure; and
transmit the signal to at least one of the first electrical heating element;
wherein the signal indicative of the presence of the animal within the internal portion is configured to:
activate at least a portion of the first electrical heating element;
wherein the signal indicative of the absence of the animal within the internal portion is configured to:

deactivate at least a portion of the first electrical heating element.

18. The protective enclosure of claim 17 and further comprising:
a second electrical heating element of the plurality of heating elements, the second electrical heating element disposed in the floor system;
wherein the floor system comprises:
an inner floor panel;
an outer floor panel; and
a floor channel formed in either the inner floor panel or the outer floor panel;
wherein the second electrical heating element is adjacent to the floor channel and sandwiched between the inner floor panel and the outer floor panel.

19. A method of manufacture for a protective enclosure for an animal, the method comprising:
forming a first inner panel;
forming a first outer panel;
forming a first channel in either the first inner panel or the first outer panel;
sandwiching a first electrical heating element adjacent to the first channel between the first inner panel and the first outer panel to form a first system, wherein the first system is selected from one of a floor system and a side wall system;
forming a second inner panel;
forming a second outer panel;
forming a second channel in either the second inner panel or the second outer panel;
sandwiching a second electrical heating element adjacent to the second channel between the second inner panel and the second outer panel to form a second system, wherein the second system is selected from the other of the floor system and the side wall system; and
connecting the first electrical heating element and the second electrical heating element to an electrical box;
wherein the first electrical heating element and the second electrical heating element are configured to direct heat inwardly from the floor system and the side wall system through the first inner panel and the second inner panel to an internal portion of the protective enclosure.

20. The method of claim 19, wherein the side wall system is at least one of a left side wall system and a right side wall system.

21. The method of claim 19, further comprising:
forming a ceiling system;
forming a roof system;
wherein the ceiling system and the roof system define a space to house the electrical box; and
positioning the electrical box in the space defined by the ceiling system and the roof system.

22. The method of claim 21, further comprising:
forming a rear wall system;
forming a front wall system;
forming a roof system;
wherein the floor system, the side wall system, the ceiling system, the rear wall system, the front wall system, and the roof system together define the internal portion of the protective enclosure; and positioning an imaging device at the rear wall system or the front wall system;
wherein the rear wall system comprises a molded receptacle; and
wherein the imaging device is positioned at the rear wall system or the front wall system via the molded receptacle using a fastener.

23. The method of claim 19, further comprising:
providing at least one sensor configured to detect a presence of the animal or an absence of the animal within the internal portion of the protective enclosure, wherein the at least one sensor is further configured to:
generate a signal indicative of the presence or the absence of the animal within the internal portion of the protective enclosure; and
transmit the signal to at least one of the first electrical heating element and the second electrical heating element;
wherein the signal indicative of the presence of the animal within the internal portion is configured to:
activate at least a portion of the first electrical heating element or at least a portion of the second electrical heating element; and
wherein the signal indicative of the absence of the animal within the internal portion is configured to:
deactivate at least a portion of the first electrical heating element and at least a portion of the second electrical heating element.

24. The method of claim 23,
wherein the at least one sensor is a radio-frequency identification (RFID) sensor;
wherein the at least one sensor is configured to pair with a RFID tag system comprising a chip; and
wherein the RFID tag system is configured to be located on a collar worn by the animal.

25. The method of claim 19 further comprising:
providing a temperature sensor configured to detect temperature inside the internal portion of the protective enclosure, wherein the temperature sensor is further configured to regulate the temperature inside the internal portion of the protective enclosure;
wherein regulating the temperature comprises:
activating at least a portion of the first electrical heating element or the at least a portion of the second electrical heating element; and
deactivating at least the portion of the first electrical heating element or at least a portion of the second electrical heating element, based on a predetermined temperature setting.

26. The method of claim 19, wherein the first electrical heating element comprises:
a trace extender extending from the floor system or the side wall system;
wherein the trace extender is configured to connect the first electrical heating element or the second electrical heating element with the electrical box.

27. The method of claim 26, wherein the floor system comprises:
a cut-out configured to allow the trace extender to extend from the floor system or the side wall system.

* * * * *